United States Patent
Ha et al.

(10) Patent No.: US 10,015,423 B2
(45) Date of Patent: Jul. 3, 2018

(54) IMAGE SENSOR AND A METHOD OF OPERATING THE SAME

(71) Applicant: SAMSUNG ELECTRONICS CO., LTD., Suwon-si, Gyeonggi-do (KR)

(72) Inventors: Sang-Hoon Ha, Seongnam-si (KR); Ji-Yong Park, Seoul (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 0 days.

(21) Appl. No.: 15/331,195

(22) Filed: Oct. 21, 2016

(65) Prior Publication Data

US 2017/0126997 A1  May 4, 2017

(30) Foreign Application Priority Data

Nov. 3, 2015 (KR) .................. 10-2015-0154014

(51) Int. Cl.
| | |
|---|---|
| *H04N 5/359* | (2011.01) |
| *H04N 5/355* | (2011.01) |
| *H04N 5/374* | (2011.01) |
| *H04N 5/3745* | (2011.01) |

(52) U.S. Cl.
CPC ....... *H04N 5/3591* (2013.01); *H04N 5/35581* (2013.01); *H04N 5/37457* (2013.01)

(58) Field of Classification Search
CPC ............. H04N 5/3591; H04N 5/35581; H04N 5/37457
See application file for complete search history.

(56) References Cited

U.S. PATENT DOCUMENTS

| | | |
|---|---|---|
| 6,580,106 B2 | 6/2003 | Hynecek |
| 6,882,022 B2 | 4/2005 | Hynecek |
| 7,224,390 B2 | 5/2007 | Kokubun et al. |
| 7,381,936 B2 | 6/2008 | Tan et al. |
| 7,791,113 B2 | 9/2010 | Hynecek et al. |
| 7,808,538 B2 | 10/2010 | Shan et al. |
| 8,199,232 B2 | 6/2012 | Watanabe |
| 8,274,588 B2 | 9/2012 | Mabuchi |

(Continued)

FOREIGN PATENT DOCUMENTS

| | | |
|---|---|---|
| JP | 2011-199781 | 10/2011 |
| KR | 10-0364605 | 12/2002 |

(Continued)

*Primary Examiner* — Jason A Flohre
(74) *Attorney, Agent, or Firm* — F. Chau & Associates, LLC

(57) ABSTRACT

In a method of operating an image sensor, a first pixel and a second pixel are commonly connected to a floating diffusion node. A voltage of the floating diffusion node is boosted. A first image signal of the first pixel is read through the floating diffusion node after of the voltage of the floating diffusion node is boosted. A second image signal of the second pixel is read through the floating diffusion node after the first image signal is read. The image sensor has a shared structure in which a plurality of pixels are connected to a single floating diffusion node. Blooming may be reduced in the image sensor by boosting the voltage of the floating diffusion node before reading the image signal to lower the potential barrier formed between the photodiode and the floating diffusion node and drain the saturated photocharges into the floating diffusion node.

15 Claims, 24 Drawing Sheets

(56) References Cited

U.S. PATENT DOCUMENTS

| | | |
|---|---|---|
| 8,279,328 B2 | 10/2012 | Lahav et al. |
| 8,319,262 B2 | 11/2012 | Janesick |
| 8,593,550 B2 | 11/2013 | Lee et al. |
| 8,878,266 B2 | 11/2014 | Lim |
| 8,953,075 B2 | 2/2015 | Ayers et al. |
| 2002/0093034 A1 | 7/2002 | Hynecek |
| 2005/0128327 A1 | 6/2005 | Bencuya et al. |
| 2007/0246788 A1 | 10/2007 | Mauritzson et al. |
| 2007/0285526 A1* | 12/2007 | Mann ................ H04N 5/23245 348/222.1 |
| 2008/0192135 A1* | 8/2008 | Yamashita ............. H04N 5/335 348/308 |
| 2009/0272879 A1* | 11/2009 | Dai ...................... H04N 5/3559 250/208.1 |
| 2010/0182469 A1 | 7/2010 | Takamiya et al. |
| 2011/0036969 A1* | 2/2011 | Ahn ..................... H04N 5/3597 250/208.1 |
| 2011/0063486 A1* | 3/2011 | Saeki ............... H01L 27/14603 348/294 |
| 2011/0187909 A1 | 8/2011 | Zhu et al. |
| 2012/0104464 A1 | 5/2012 | Janesick et al. |
| 2013/0009043 A1* | 1/2013 | Mao ................... H04N 5/35509 250/208.1 |
| 2013/0182154 A1* | 7/2013 | Kimura ................ H04N 5/2353 348/272 |
| 2013/0208154 A1 | 8/2013 | Wang et al. |
| 2014/0247380 A1 | 9/2014 | Hynecek |
| 2014/0313386 A1 | 10/2014 | Jiang et al. |
| 2014/0320718 A1 | 10/2014 | Fan |
| 2015/0115332 A1 | 4/2015 | Hynecek et al. |
| 2016/0173793 A1* | 6/2016 | Mitsunaga ......... H04N 5/35563 348/229.1 |
| 2016/0353034 A1* | 12/2016 | Mauritzson ............ H04N 5/343 |
| 2017/0070691 A1* | 3/2017 | Nishikido .......... H04N 5/35581 |
| 2017/0078594 A1* | 3/2017 | Kawabata ............ H04N 5/3535 |

FOREIGN PATENT DOCUMENTS

| | | |
|---|---|---|
| KR | 10-0714611 | 4/2007 |
| KR | 10-1246141 | 3/2013 |
| KR | 10-1248436 | 3/2013 |

* cited by examiner

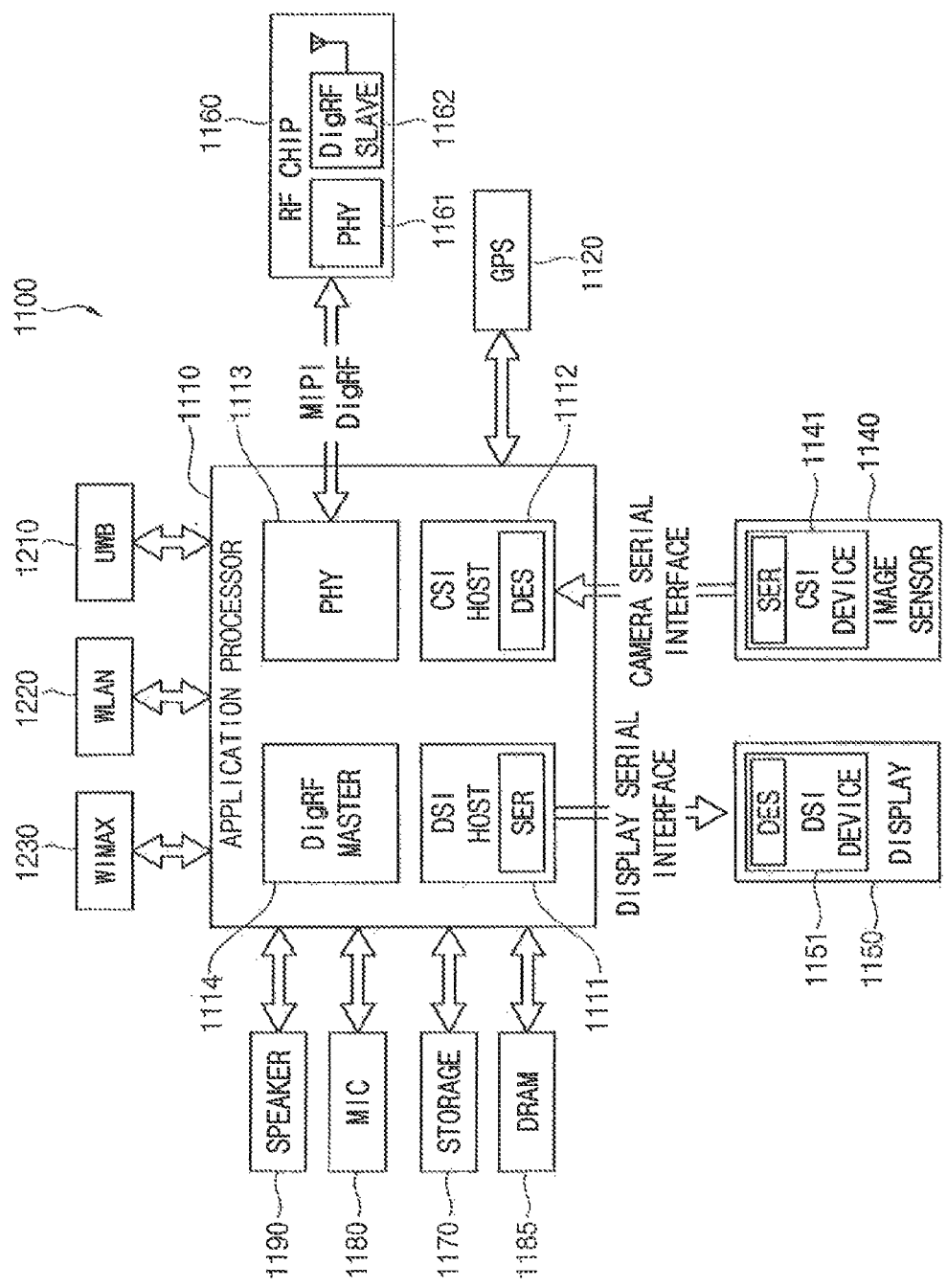

IMAGE SENSOR AND A METHOD OF OPERATING THE SAME

CROSS-REFERENCE TO RELATED APPLICATION

This U.S. Nonprovisional application claims priority under 35 U.S.C. § 119(a) to Korean Patent Application No. 10-2015-0154014, filed on Nov. 3, 2015, in the Korean Intellectual Property Office (KIPO), the disclosure of which is incorporated by reference in its entirety herein.

TECHNICAL FIELD

Exemplary embodiments of the present inventive concept relate generally to semiconductor integrated circuit, and more particularly to an image sensor and a method of operating an image sensor.

DISCUSSION OF RELATED ART

An image sensor is a semiconductor device that converts a photo image, for example, light reflected by an object, into an electric signal. The image sensor is widely used in portable electronic devices, such as digital cameras, cellular phones, and the like. Generally, the image sensors can be classified into charged coupled device (CCD) image sensors and complementary metal oxide semiconductor (CMOS) image sensors. Recently, CMOS image sensors have received more attention compared to CCD image sensors because of low manufacturing costs, low power consumption, ease of integration with peripheral circuits, and the like.

Additionally, photocharges are generated by incident light in a photodetector, such as a photodiode in the image sensor. If the photocharges exceed the capacity of the photodetector, blooming may occur such that surplus or saturated charges generated in one photodetector overflow into other neighboring photodetectors to distort an image captured by the image sensor.

SUMMARY

According to an exemplary embodiment of the inventive concept, a method of operating an image sensor may include: connecting a first pixel and a second pixel commonly to a floating diffusion node, boosting a voltage of the floating diffusion node, reading a first image signal of the first pixel through the floating diffusion node after the voltage of the floating diffusion node is boosted, and reading a second image signal of the second pixel through the floating diffusion node after the first image signal is read.

Boosting the voltage of the floating diffusion node may include increasing the voltage of the floating diffusion node from a first voltage corresponding to a reset level to a second voltage that is higher than the first voltage, and restoring the voltage of the floating diffusion node from the second voltage to the first voltage.

The first image signal may correspond to photocharges integrated in the first pixel during a first integration time and the second image signal may correspond to photocharges integrated in the second pixel during a second integration time, which is longer than the first integration time.

The voltage of the floating diffusion node may be boosted during an integration time of the first pixel and the second pixel.

Boosting the voltage of the floating diffusion node may include: turning on a reset transistor to apply a first voltage, corresponding to a reset level, to the floating diffusion node, turning off the reset transistor to float the floating diffusion node that has the first voltage, and applying a first voltage pulse to a neighboring wire adjacent to a read wire connected to the floating diffusion node, while the floating diffusion node is floated.

The voltage of the floating diffusion node may be boosted to a second voltage that is higher than the first voltage by capacitive coupling between the read wire and the neighboring wire during the first voltage pulse.

Reading the first image signal of the first pixel may include transferring photocharges integrated in a first photodiode in the first pixel to the floating diffusion node by turning on a first transfer gate in the first pixel and applying a second voltage pulse to the neighboring wire while the first transfer gate is turned on.

Reading the second image signal of the second pixel may include transferring photocharges integrated in a second photodiode in the second pixel to the floating diffusion node by turning on a second transfer gate in the second pixel and applying a third voltage pulse to the neighboring wire while the second transfer gate is turned on.

Boosting the voltage of the floating diffusion node may include: turning on a reset transistor to apply a first voltage, corresponding to a reset level, to the floating diffusion node; turning off the reset transistor to float the floating diffusion node that has the first voltage; applying a first voltage pulse to a first neighboring wire adjacent to a read wire, which is connected to the floating diffusion node, while the floating diffusion node is floated; and applying a second voltage pulse to a second neighboring wire adjacent to the read wire while the floating diffusion node is floated.

At least a portion of a pulse duration of the first voltage pulse may overlap with at least a portion of a pulse duration of the second voltage pulse.

The voltage of the floating diffusion node may be boosted to a second voltage, which is higher than the first voltage, by capacitive coupling between the read wire and the first neighboring wire and capacitive coupling between the read wire and the second neighboring wire while the pulse duration of the first voltage pulse overlaps with the pulse duration of the second voltage pulse Boosting the voltage of the floating diffusion node may include changing a reset voltage from a first voltage corresponding to a reset level to a second voltage that is higher than the first voltage while a reset transistor for applying the reset voltage to the floating diffusion node is turned on and restoring the voltage of the floating diffusion node from the second voltage to the first voltage while the reset transistor is turned on.

The method of an operating an image sensor may further include: connecting a third pixel and a fourth pixel commonly to the floating diffusion node, reading a third image signal of the third pixel through the floating diffusion node after the second image signal is read and reading a fourth image signal of the fourth pixel through the floating diffusion node after the third image signal is read.

Connecting the first pixel and the second pixel commonly to the floating diffusion node may include forming a floating diffusion node in a semiconductor substrate, forming a first photodiode of the first pixel in the semiconductor substrate, forming a second photodiode of the second pixel in the semiconductor substrate, forming a first transfer gate of the first pixel on the semiconductor substrate between the first photodiode and the floating diffusion node, and forming a second transfer gate of the second pixel on the semiconductor substrate between the second photodiode and the floating diffusion node.

According to an exemplary embodiment of the inventive concept, a method of operating an image sensor may include: connecting a plurality of pixels commonly to a floating diffusion node, boosting a voltage of the floating diffusion node, and sequentially reading image signals integrated in the plurality of pixels through the floating diffusion node after the voltage of the floating diffusion node is boosted.

According to an exemplary embodiment of the inventive concept, an image sensor may include: a controller; and a pixel array including a plurality of pixels that are arranged in a plurality of pixel groups, each pixel group including a first pixel and a second pixel that are commonly connected to a floating diffusion node. The controller boosts a voltage of the floating diffusion node before reading image signals of the first pixel and the second pixel, and exposure time of the first pixel is shorter than exposure time of the second pixel.

According to an exemplary embodiment of the inventive concept, the image sensor may include a read wire connected to the floating diffusion node and a neighboring wire adjacent to the read wire such that a capacitive coupling is formed between the neighboring wire and the read wire. The read wire and the neighboring wire may be formed over a semiconductor substrate, and the capacitive coupling may be used to boost the voltage of the floating diffusion node by controlling a boost signal applied to the neighboring wire.

According to an exemplary embodiment of the inventive concept, the pixel group may further include a read circuit connected to the first pixel and the second pixel via the floating diffusion node and a voltage selector connected to the read circuit. The voltage selector selects and outputs a reset voltage based on a control signal and the voltage of the floating diffusion node is boosted based on the reset voltage.

According to an exemplary embodiment of the inventive concept, in the image sensor, the plurality of pixels may be arranged in a matrix form with a plurality of rows and a plurality of columns, the plurality of pixels includes either short exposure pixels or long exposure pixels, and the short exposure pixels and the long exposure pixels may be alternatively arranged in a row direction or a column direction.

According to an exemplary embodiment of the inventive concept, in the image sensor, the plurality of pixels may be arranged in a matrix form with a plurality of rows and a plurality of columns, the plurality of pixels includes either short exposure pixels or long exposure pixels, and the short exposure pixels and the long exposure pixels may be alternatively arranged in a diagonal direction.

BRIEF DESCRIPTION OF THE DRAWINGS

Exemplary embodiments of the present disclosure will be more clearly understood from the following detailed description taken in conjunction with the accompanying drawings.

FIG. 29 is a block diagram illustrating an example of an interface that is used in the electronic device of FIG. 26.

DETAILED DESCRIPTION OF THE EMBODIMENTS

Figure 1:
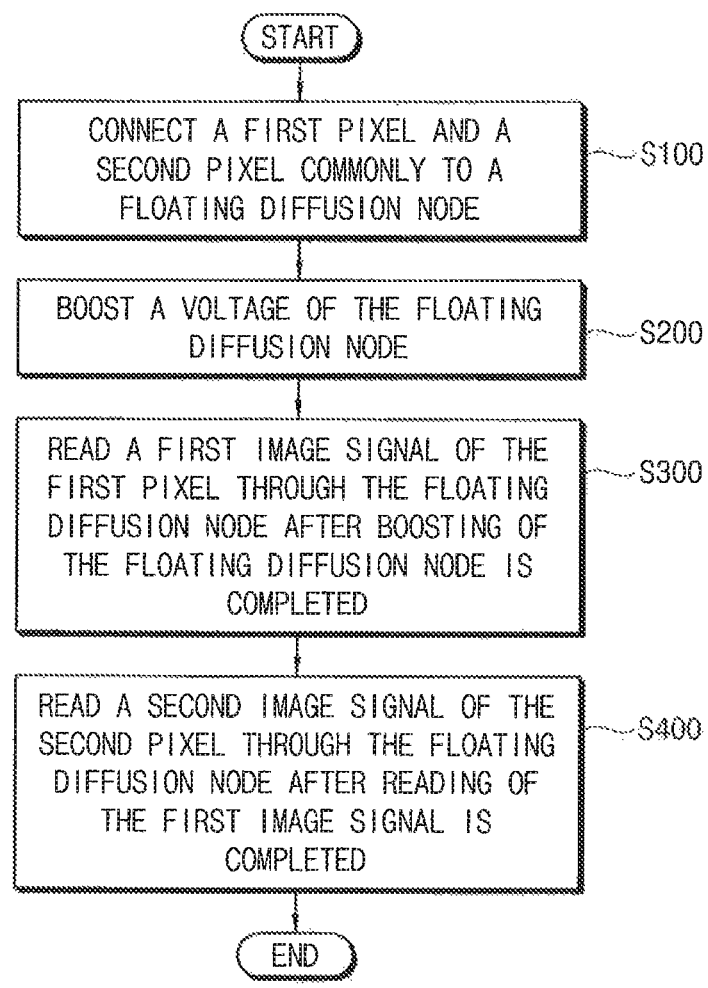
FIG. 1 is a flow chart illustrating a method of operating an image sensor according to an exemplary embodiment of the inventive concept.

Various exemplary embodiments will be described more fully hereinafter with reference to the accompanying drawings, in which some exemplary embodiments are shown. The present disclosure may, however, be embodied in many different forms and should not be construed as limited to the exemplary embodiments set forth herein. Rather, these exemplary embodiments are provided so that this disclosure will be thorough and complete, and will fully convey the scope of the present disclosure to those skilled in the art. In the drawings, the sizes and relative sizes of layers and regions may be exaggerated for clarity. Like numerals refer to like elements throughout.

It will be understood that, although the terms "first," "second," "third," etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to limit the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of operating an image sensor according to an exemplary embodiment of the inventive concept.

Referring to FIG. 1, a first pixel and a second pixel are commonly connected to a floating diffusion node FD (S100). Two pixels may be commonly connected to a single floating diffusion node FD as will be described below with reference to FIGS. 3 through 11, or four pixels may be commonly connected to a single floating diffusion node FD as will be described below with reference to FIGS. 19 through 24. Even though exemplary embodiments are described mainly for a first pixel and a second pixel commonly connected to one floating diffusion node FD for convenience of illustration and description, it should be understood that the method of operating the image sensor can be applied to various shared structures in which an arbitrary number of pixels are commonly connected to a single floating diffusion node FD.

A voltage of the floating diffusion node FD is boosted before reading image signals of the first pixel and the second pixel (S200). As will be described below with reference to FIG. 5, boosting the voltage of the floating diffusion node FD may be performed by increasing the voltage of the floating diffusion node FD from a first voltage corresponding to a reset level to a second voltage higher than the first voltage and then restoring the voltage of the floating diffusion node FD from the second voltage to the first voltage.

A first image signal of the first pixel is read through the floating diffusion node FD after the voltage of the floating diffusion node FD is boosted (S300). A second image signal of the second pixel is read through the floating diffusion node FD after the first image signal FD is read. The first image signal corresponds to photocharges integrated in the first pixel during a first integration time tSI and the second image signal corresponds to photocharges integrated in the second pixel during a second integration time tLI, which is longer than the first integration time tSI. The first pixel having the first integration time tSI or a shorter exposure time may be referred to as a short exposure pixel, and the second pixel having the second integration time tLI or a longer exposure time may be referred to as a long exposure pixel.

As such, for the image sensor having a shared structure in which a plurality of pixels are connected to a single floating diffusion node FD and the method of operating the image sensor according to exemplary embodiments, blooming may be reduced by boosting the voltage of the floating diffusion node before reading the image signal to lower the potential barrier formed between the photodiode and the floating diffusion node and thus drain the saturated photocharges into the floating diffusion node. In particular, if the pixels have different exposure times, boosting the voltage of the floating diffusion node before reading the image signal may reduce the blooming effect on the image signal of the short exposure pixel caused by the saturated photocharges of the long exposure pixel.

Figure 2:
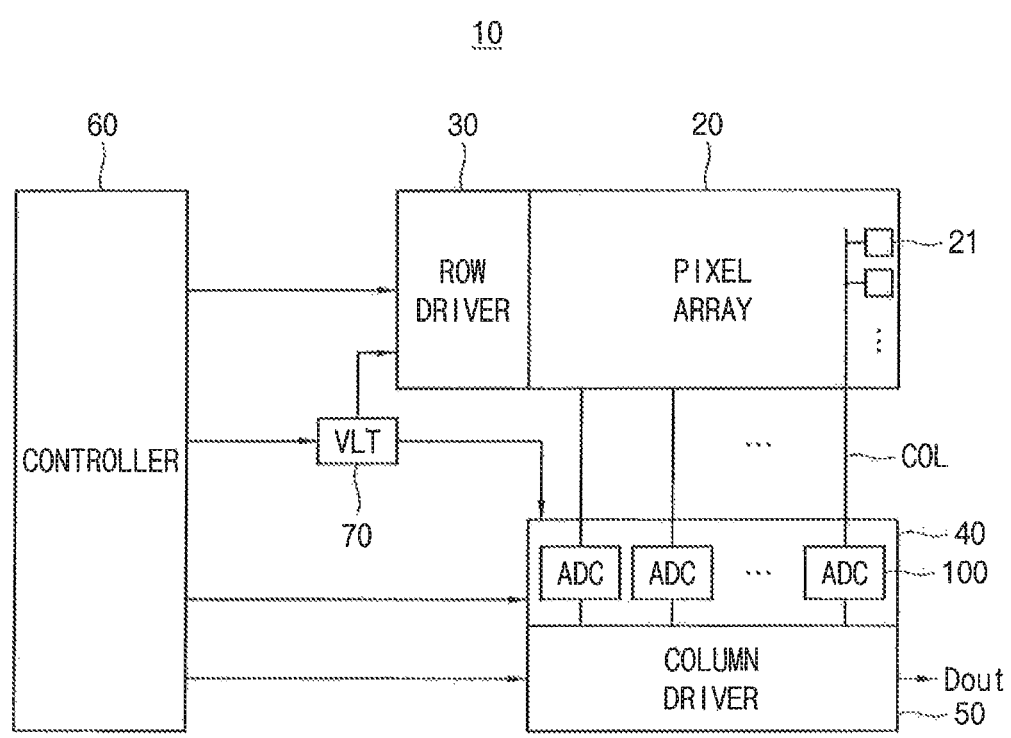
FIG. 2 is a block diagram illustrating an image sensor according to an exemplary embodiment of the inventive concept.

FIG. 2 is a block diagram illustrating an image sensor according to an exemplary embodiment of the inventive concept.

Referring to FIG. 2, an image sensor 10 may include a pixel array 20, a row driver 30, an analog-to-digital conversion circuit 40, a column driver 50, a controller 60, and a voltage generator VLT 70.

The pixel array 20 includes a plurality of pixels 21 coupled to column lines COL, respectively, and the plurality of pixels 21 senses incident lights to generate analog signals through the column lines COL. The plurality of pixels 21 may be arranged in matrix form with a plurality of rows and a plurality of columns. The pixel array 20 may have a shared structure, as will be described below, in which a plurality of pixels are commonly connected to each floating diffusion node.

The row driver 30 may be coupled to the rows of the pixel array 20 to generate signals for driving the rows. For example, the row driver 30 may drive the pixels in the pixel array 20 row by row.

The analog-to-digital conversion circuit 40 may be coupled to the columns of the pixel array 20 to convert the analog signals from the pixel array 20 to digital signals. As illustrated in FIG. 2, the analog-to-digital conversion circuit 40 may include a plurality of analog-to-digital converters (ADC) 100 to perform analog-to-digital conversion of the analog signals output from the column lines COL in parallel or simultaneously. The analog-to-digital converters 100 may be delta-sigma analog-to-digital converters for performing delta-sigma modulation and digital filtering to convert the analog signals to digital signals.

The analog-to-digital conversion circuit 40 may include a correlated double sampling (CDS) unit. In an exemplary embodiment, the CDS unit may perform an analog double sampling by extracting a valid image component based on a difference between an analog reset signal and an analog image signal. In another exemplary embodiment, the CDS unit may perform a digital double sampling by converting the analog reset signal and the analog image signal to two digital signals and extracting a difference between the two digital signals as the valid image component. In still another exemplary embodiment, the CDS unit may perform a dual CDS by performing both the analog double sampling and digital double sampling.

The column driver 50 may output the digital signals from the analog-to-digital conversion circuit 40 sequentially as output data Dout.

The controller 60 may control the row driver 30, the analog-to-digital conversion circuit 40, the column driver 50, and the voltage generator 70. The controller 60 may provide control signals such as clock signals, timing control signals, etc. required for the operations of the row driver 30, the analog-to-digital conversion circuit 40, the column driver 50, and the voltage generator 70. The controller 60 may include a control logic circuit, a phase-locked loop, a timing control circuit, a communication interface circuit, etc.

In particular, the controller 60 may control the pixel array 20 and the row driver 30 such that the voltage of the floating diffusion node may be boosted and the image signals of the pixels commonly connected to the floating diffusion node may be read sequentially after the voltage of the floating diffusion node is boosted. By boosting the voltage of the floating diffusion node before reading the image signals, the potential barrier between the photodiode and the floating diffusion node may be lowered to drain the saturated photocharges in the photodiode to reduce blooming.

The voltage generator 70 may generate various voltages used in the image sensor 10. For example, the voltage generator 70 may generate a first voltage VDD and a second voltage VBST higher than the first voltage VDD and provide the voltages VDD and VBST to the row driver 30. In addition, the voltage generator 70 may generate a ramp voltage that increases or decreases gradually and provide the ramp voltage to the analog-to-digital conversion circuit 40.

Figure 3:
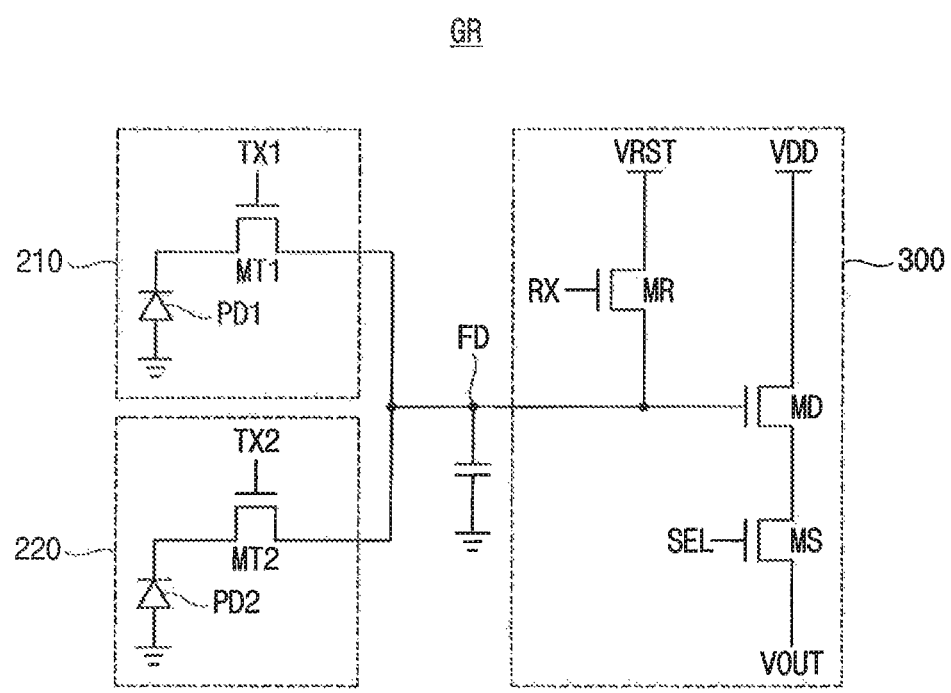
FIG. 3 is a circuit diagram illustrating a shared structure in which two pixels are commonly connected to a single floating diffusion node.
Figure 4:
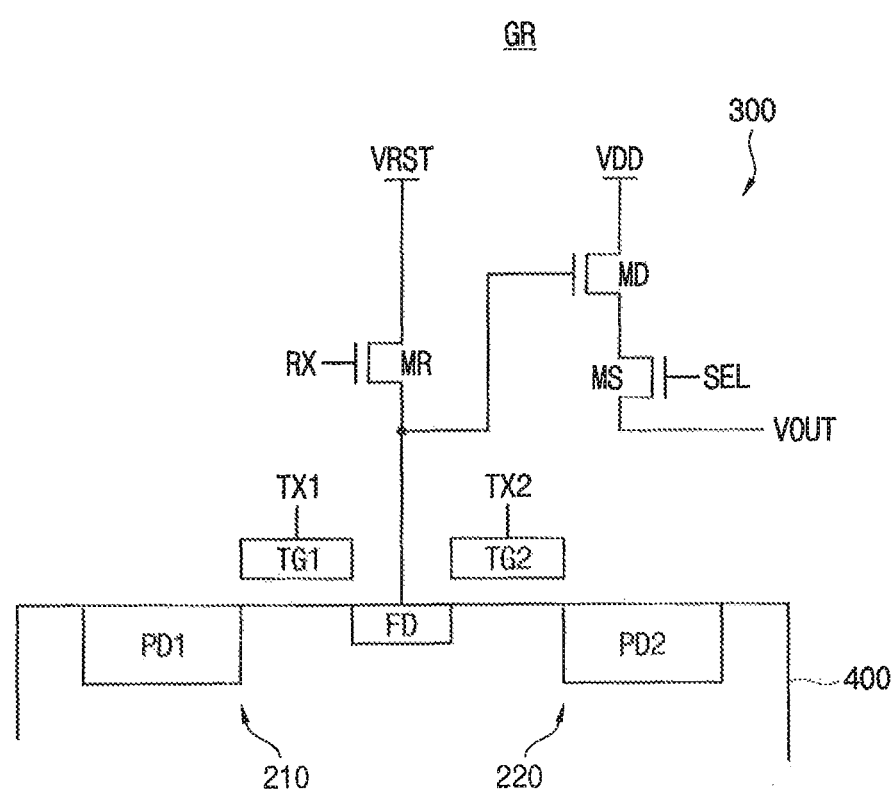
FIG. 4 is a cross-sectional diagram illustrating the shared structure of the pixels.

FIG. 3 is a circuit diagram illustrating a shared structure in which two pixels are commonly connected to a single floating diffusion node, and FIG. 4 is a cross-sectional diagram illustrating the shared structure of the pixels.

Referring to FIGS. 3 and 4, a pixel group GR may include a floating diffusion node FD, a first pixel 210, a second pixel 220, and a read circuit 300. The first pixel 210 and the second pixel 220 may be commonly connected to the floating diffusion node FD. The pixel group GR as illustrated in FIG. 3 may be arranged repeatedly in a row direction and a column direction in the pixel array 20 in FIG. 2.

The first pixel 210 may include a first photodiode PD1 and a first transfer transistor MT1. The second pixel 220 may include a second photodiode PD2 and a second transfer transistor MT2. The read circuit 300 may include a reset transistor MR, a source follower transistor or a driving transistor MD, and a selection transistor MS. FIG. 3 illustrates a non-limiting example where each pixel includes one transistor and the read circuit includes three transistors, but the method according to exemplary embodiments may be applied to operate an image sensor of various configurations other than that of FIG. 3.

As illustrated in FIG. 4, the floating diffusion node FD, the first photodiode PD1 and the second photodiode PD2 may be formed in the semiconductor substrate 400. A first transfer gate TG1 of the first pixel 210 may be formed on the semiconductor substrate 400 between the first photodiode PD1 and the floating diffusion node FD. The second transfer gate TG2 of the second pixel 220 may be formed on the semiconductor substrate 400 between the second photodiode PD2 and the floating diffusion node FD. The first transfer transistor MT1 of FIG. 3 may correspond to a portion of the first photodiode PD1, the first transfer gate TG1, and a portion of the floating diffusion node FD. The second transfer transistor MT2 of FIG. 3 may correspond to a portion of the second photodiode PD2, the second transfer gate TG2, and a portion of the floating diffusion node FD.

The voltage of the floating diffusion node FD may be reset to a reset voltage VRST when the reset transistor MR is turned on. In some exemplary embodiments, the reset voltage VRST may be fixed to the first voltage VDD. In other exemplary embodiments, the reset voltage VRST may be varied between the first voltage VDD and the second voltage VBST.

During integration periods, light is incident on the photodiodes PD1 and PD2 and electron-hole pairs (EHP) are generated depending on the amount of the incident light. As will be described below with reference to FIG. 5, the first pixel 210 may be a short exposure pixel having a relatively short integration time tSI and the second pixel 220 may be a longer exposure pixel having a relatively long integration time tLI. In this case, the integration period of the second pixel 220 may be finished after the integration period of the first pixel 210 is finished.

After the integration period of the first pixel 210 is finished, a first transfer signal TX1 to the first transfer gate TG1 transitions to a logical high level, the photocharges integrated in the first photodiode PD1 are transferred to the floating diffusion node FD and the voltage of the floating diffusion node FD is lowered depending on the amount of the transferred charges. After that, a row selection signal SEL transitions to a logical high level to turn on the selection transistor MS and thus the source voltage of the driving transistor MD is output as an output voltage VOUT corresponding to the first image signal.

After the integration period of the second pixel 220 is finished, a second transfer signal TX2 to the second transfer gate TG2 transitions to a logical high level, the photocharges integrated in the second photodiode PD2 are transferred to the floating diffusion node FD and the voltage of the floating diffusion node FD is lowered depending on the amount of the transferred charges. After that, the row selection signal SEL transitions to a logical high level to turn on the selection transistor MS and thus the source voltage of the driving transistor MD is output as the output voltage VOUT corresponding to the second image signal.

Figure 5:
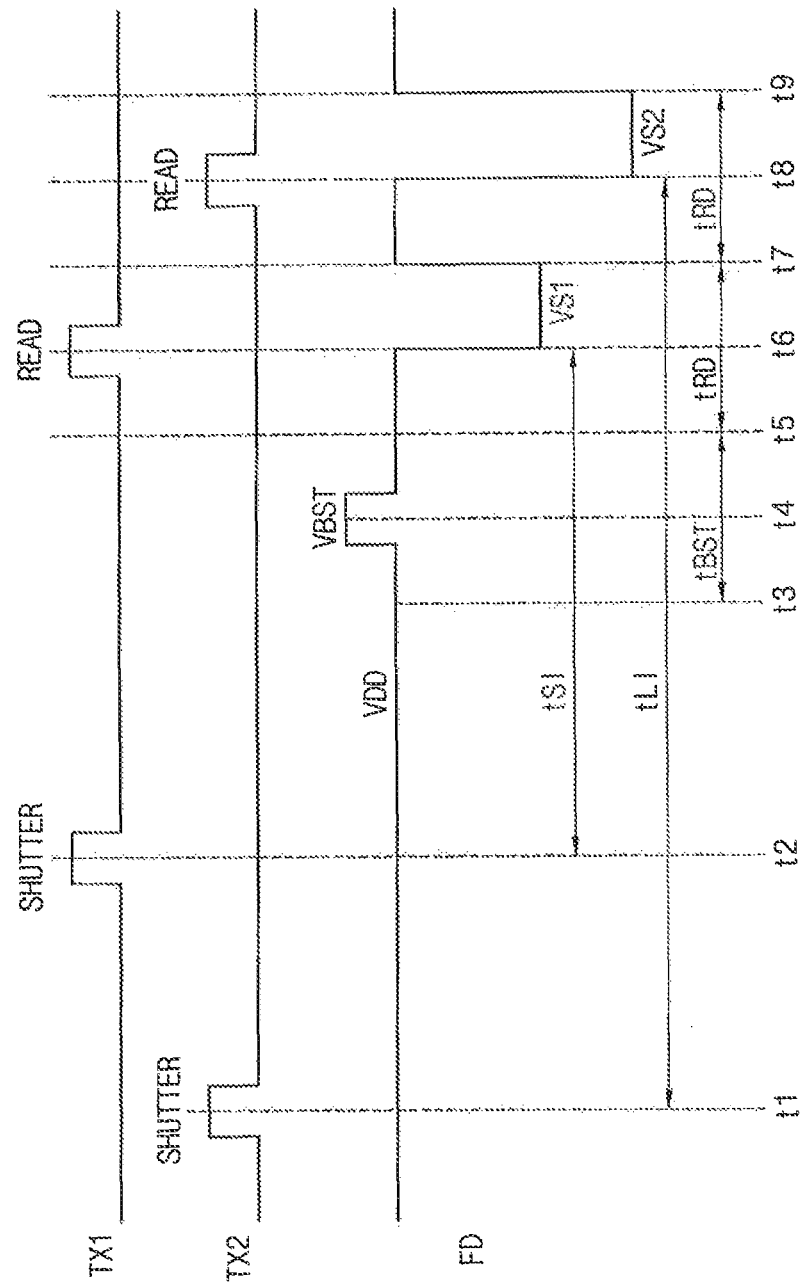
FIG. 5 is a timing diagram illustrating a method of operating an image sensor according to an exemplary embodiment of the inventive concept.

FIG. 5 is a timing diagram illustrating a method of operating an image sensor according to an exemplary embodiment of the inventive concept.

Referring to FIGS. 2 through 5, the first pixel 210 may be a short exposure pixel having a first integration time tSI and the second pixel 220 may be a long exposure pixel having a second integration time tLI that is longer than the first integration time tSI. With reference to these figures, the first pixel 210 and the second pixel 220 may be interchangeably referred to as the short exposure pixel 210 and the long exposure pixel 220, respectively.

Figure 13:
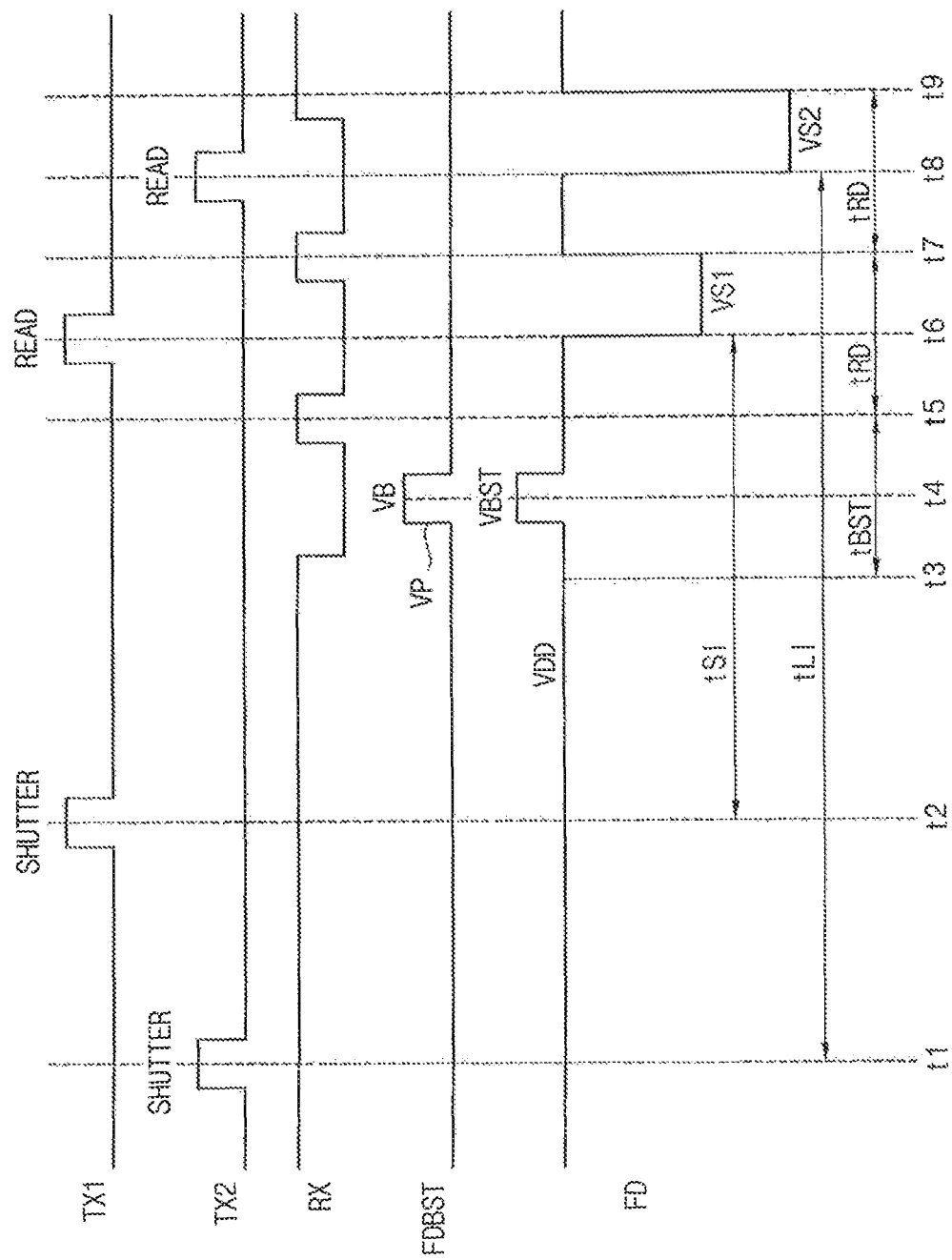
FIGS. 13 and 14 are timing diagrams illustrating a method of operating an image sensor using the wire structure of FIG. 12 according to an exemplary embodiment of the inventive concept.

At time point t1, the second transfer signal TX2 of the long exposure pixel 220 is activated as a pulse to start the second integration time tLI. At time point t2, the first transfer signal TX1 of the short exposure pixel 210 is activated as a pulse to start the first integration time tSI. At time points t1 and t2, the reset signal RX may be activated as illustrated in FIG. 13 to turn on the reset transistor MR and thus the floating diffusion node FD and the photodiodes PD1 and PD2 may be reset to the first voltage VDD.

The voltage of the floating diffusion node FD is boosted during a boosting time tBST corresponding to time interval t3~t5. The first image signal VS1 corresponding to the photocharges integrated in the short exposure pixel 210 is read during a read time tRD corresponding to time interval t5~t7. The second image signal VS2 corresponding to the photocharges integrated in the long exposure pixel 220 is read during the read time tRD corresponding to time interval t7~t9.

Around time point t4, the voltage of the floating diffusion node FD is increased from the first voltage VDD, corresponding to a reset level, to the second voltage VBST, which is higher than the first voltage VDD, and then the voltage of the floating diffusion node FD is restored from the second voltage VBST to the first voltage VDD. As illustrated in FIG. 5, boosting of the voltage of the floating diffusion node FD may be performed during the first integration time tSI of the first pixel 210 and the second integration time tLI of the second pixel 220.

In some exemplary embodiments, the voltage boosting operation may be performed using capacitive coupling between wires as will be described below with reference to FIGS. 12 through 16. In other exemplary embodiments, the voltage boosting operation may be performed by changing the reset voltage VRST between the first voltage VDD and the second voltage VBST as will be described below with reference to FIGS. 17 and 18.

At time point t6, the first transfer signal TX1 of the short exposure pixel 210 is activated as a pulse, the first integration time tSI is finished, and the voltage of the floating diffusion node FD is changed to a level corresponding to the first image signal VS1. At time point t8, the second transfer signal TX2 of the long exposure pixel 220 is activated as a pulse, the second integration time tLI is finished, and the voltage of the floating diffusion node FD is changed to a level corresponding to the second image signal VS2. At time points t6 and t8, the reset signal RX may be deactivated as illustrated in FIG. 13 to turn off the reset transistor MR and thus the floating diffusion node FD is separated from the reset voltage VRST.

Figure 6:
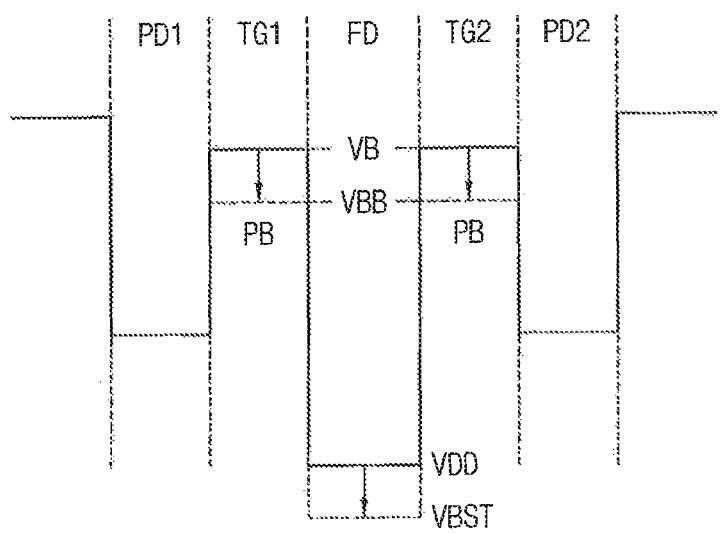
FIG. 6 is a diagram for describing an effect of reducing blooming according to an exemplary embodiment of the inventive concept.

FIG. 6 is a diagram for describing an effect of reducing blooming according to an exemplary embodiment of the inventive concept.

FIG. 6 illustrates an electric potential distribution of the semiconductor substrate 400 in FIG. 4. When the transfer gates TG1 and TG2 are turned off, potential barriers PB are formed between the floating diffusion node FD and the respective photodiodes PD1 and PD2.

If the first pixel 210 and the second pixel 220 sharing the floating diffusion node FD have different integration times, blooming may occur from the second pixel 220, having the long exposure time tLI, to the first pixel 210, having the short exposure time tSI. In other words, if the second photodiode PD2 of the second pixel 220 is in a saturated state, the saturated or surplus charges may overflow from the second photodiode PD2 to the floating diffusion node FD through a blooming path between the second photodiode PD2 and the floating diffusion node FD. The overflown charges are then integrated in the floating diffusion node FD during the read time tRD of the first pixel 210 corresponding to time interval t5~t7, and thus the first image signal of the first pixel 210 may be distorted.

According to exemplary embodiments, the voltage of the floating diffusion node FD may be boosted or increased temporarily from the first voltage VDD to the second voltage VBST during the voltage boosting time tBST corresponding to time interval t3~t5. At this time, the potential barriers PB under the transfer gates TG1 and TG2 may be lowered from VB to VBB. The flow of charges from the second photodiode PD2 of the second pixel 220 to the floating diffusion node FD may increase as the potential barriers PB decrease. Thus, the overflown charges to the floating diffusion node FD may be drained during the on-time of the reset transistor MR.

After that, when the reset transistor MR is turned off and the floating diffusion node FD is floated to read the first pixel 210, the potential barriers PB are restored to the original level VB. The charge capacity of the second pixel 220 may be increased by a difference of VB−VBB, and thus blooming from the second photodiode PD2 to the floating diffusion node FD may be reduced or prevented during the read time tRD corresponding to time interval t5~t7 of the first pixel 210.

Figure 7:
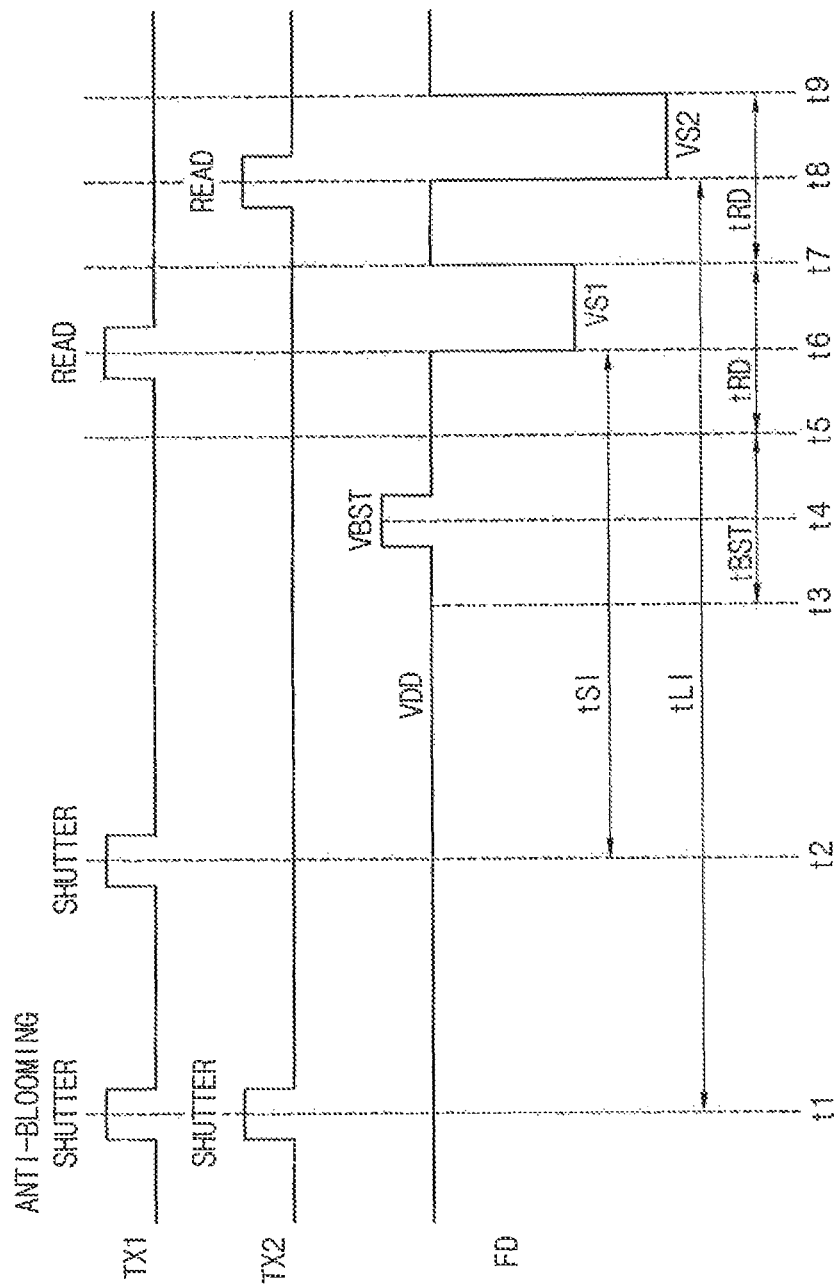
FIG. 7 is a timing diagram illustrating a method of operating an image sensor according to an exemplary embodiment of the inventive concept.

FIG. 7 is a timing diagram illustrating a method of operating an image sensor according to an exemplary embodiment of the inventive concept. The method of FIG. 7 is similar to the method of FIG. 5 and repeated descriptions are omitted.

Referring to FIGS. 2, 3, 4, and 7, at time point t2, the first transfer signal TX1 of the short exposure pixel 210 is activated as a pulse to start the first integration time tSI. At time point t1 before starting the first integration time tSI, the second transfer signal TX2 of the long exposure pixel 220 is activated as a pulse to start the second integration time tLI.

As illustrated in FIG. 7, at time point t1, the first transfer signal TX1 may also be activated as a pulse to turn on the first transfer gate TG1, which may be referred to as an anti-blooming shutter operation. In this case, the reset transistor MR may be turned on at time point t1q to drain the charges in the first photodiode PD1 of the short exposure pixel 210. Through the anti-blooming shutter operation, blooming from the short exposure pixel 210 to the long exposure pixel 220 may be reduced or prevented.

Figure 8:
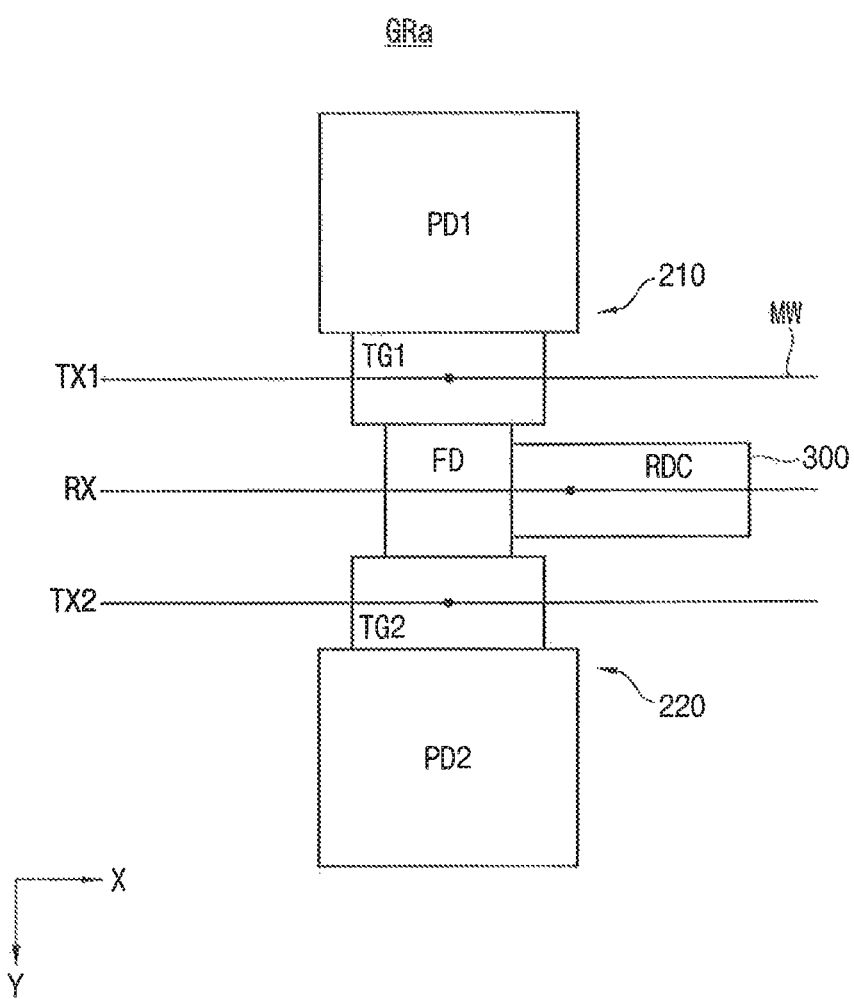
FIG. 8 is a top view illustrating an example of a shared structure in which two pixels are commonly connected to a single floating diffusion node.
Figure 9:
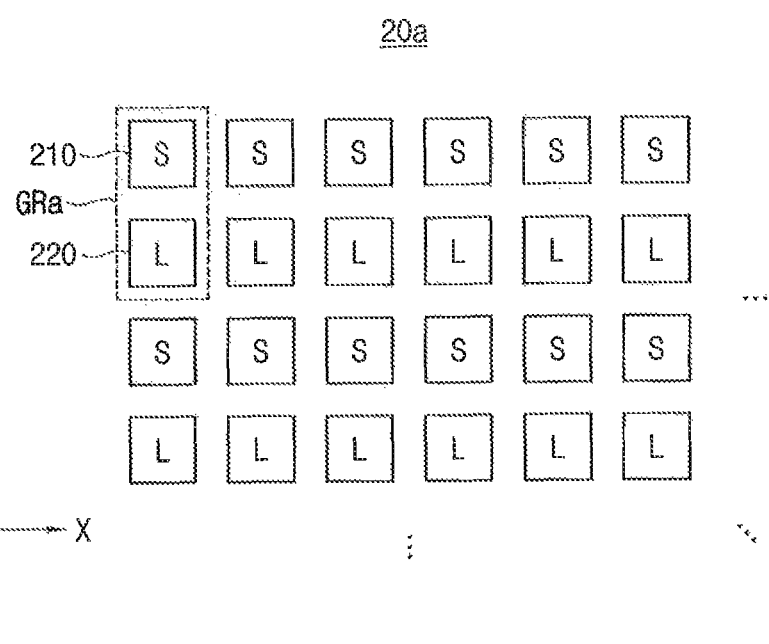
FIG. 9 is a diagram for describing an operation of a pixel array having the shared structure of FIG. 8.

FIG. 8 is a top view illustrating an example of a shared structure in which two pixels are commonly connected to a single floating diffusion node, and FIG. 9 is a diagram for describing an operation of a pixel array having the shared structure of FIG. 8.

Referring to FIG. 8, a pixel group GRa may include a floating diffusion node FD, a first pixel 210, a second pixel 220, and a read circuit (RDC) 300. The first pixel 210 and the second pixel 220 may be commonly connected to the floating diffusion node FD. The pixel group GRa as illustrated in FIG. 8 may be arranged repeatedly in a row direction and a column direction in the pixel array 20a in FIG. 9.

The first pixel 210 may include a first photodiode PD1 and a first transfer transistor MT1. The second pixel 220 may include a second photodiode PD2 and a second transfer transistor MT2. As described above, the read circuit 300 may include a reset transistor MR, a source follower transistor or a driving transistor MD, and a selection transistor MS. Control signals TX1, TX2, and RX provided to the pixel group GRa may be transferred from the row driver 30 in FIG. 2 through wires MW that extend in a row direction X.

FIGS. 8 and 9 illustrate an exemplary embodiment where the first pixel 210 and the second pixel 220 sharing the floating diffusion node FD are arranged in a column direction Y. As described with reference to FIG. 5, the first pixel 210 may be a short exposure pixel S having the first integration time tSI and the second pixel 220 may be a long exposure pixel L having the second integration time tLI, which is longer than the first integration time tSI. The control signals TX1, TX2, and RX may be provided through the wires MW that extend in the row direction X, and thus the pixels in the same row may have the same operation timings. The short exposure pixels S and the long exposure pixels L may be alternatively arranged row by row as illustrated in FIG. 9.

Figure 10:
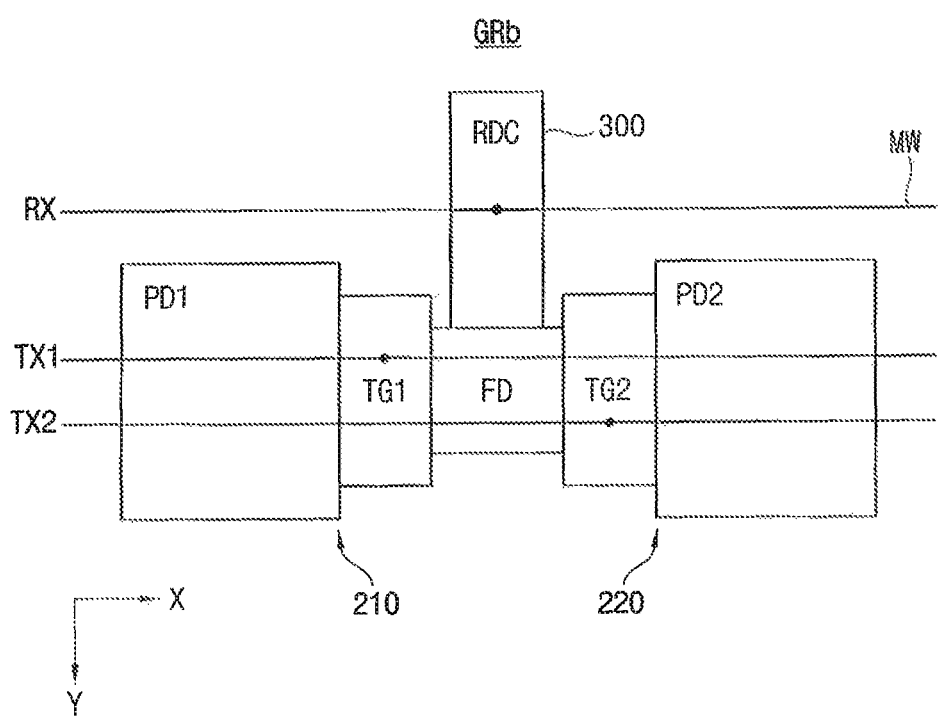
FIG. 10 is a top view illustrating an example of a shared structure in which two pixels are commonly connected to a single floating diffusion node.
Figure 11:
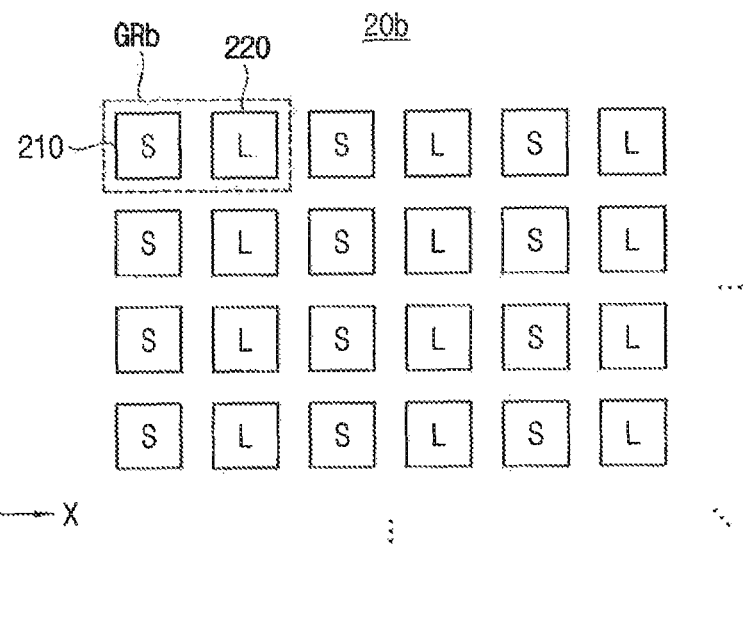
FIG. 11 is a diagram for describing an operation of a pixel array having the shared structure of FIG. 10.

FIG. 10 is a top view illustrating an example of a shared structure in which two pixels are commonly connected to a single floating diffusion node, and FIG. 11 is a diagram for describing an operation of a pixel array having the shared structure of FIG. 10.

Referring to FIG. 10, a pixel group GRb may include a floating diffusion node FD, a first pixel 210, a second pixel 220, and a read circuit (RDC) 300. The first pixel 210 and the second pixel 220 may be commonly connected to the floating diffusion node FD. The pixel group GRb as illustrated in FIG. 10 may be arranged repeatedly in a row direction and a column direction in the pixel array 20b in FIG. 11.

The first pixel 210 may include a first photodiode PD1 and a first transfer transistor MT1. The second pixel 220 may include a second photodiode PD2 and a second transfer transistor MT2. As described above, the read circuit 300 may include a reset transistor MR, a source follower transistor or a driving transistor MD, and a selection transistor MS. Control signals TX1, TX2, and RX provided to the pixel group GRb may be transferred from the row driver 30 in FIG. 2 through wires MW that extend in the row direction X.

FIGS. 10 and 11 illustrate an exemplary embodiment where the first pixel 210 and the second pixel 220 sharing the floating diffusion node FD are arranged in the row direction X. As described with reference to FIG. 5, the first pixel 210 may be the short exposure pixel S having the first integration time tSI and the second pixel 220 may be the long exposure pixel L having the second integration time tLI, which is longer than the first integration time tSI. The control signals TX1, TX2, and RX may be provided through the wires MW that extend in the row direction X, and thus the pixels in the same row may have the same operation timings. The short exposure pixels S and the long exposure pixels L may be alternatively arranged column by column as illustrated in FIG. 11.

Figure 12:
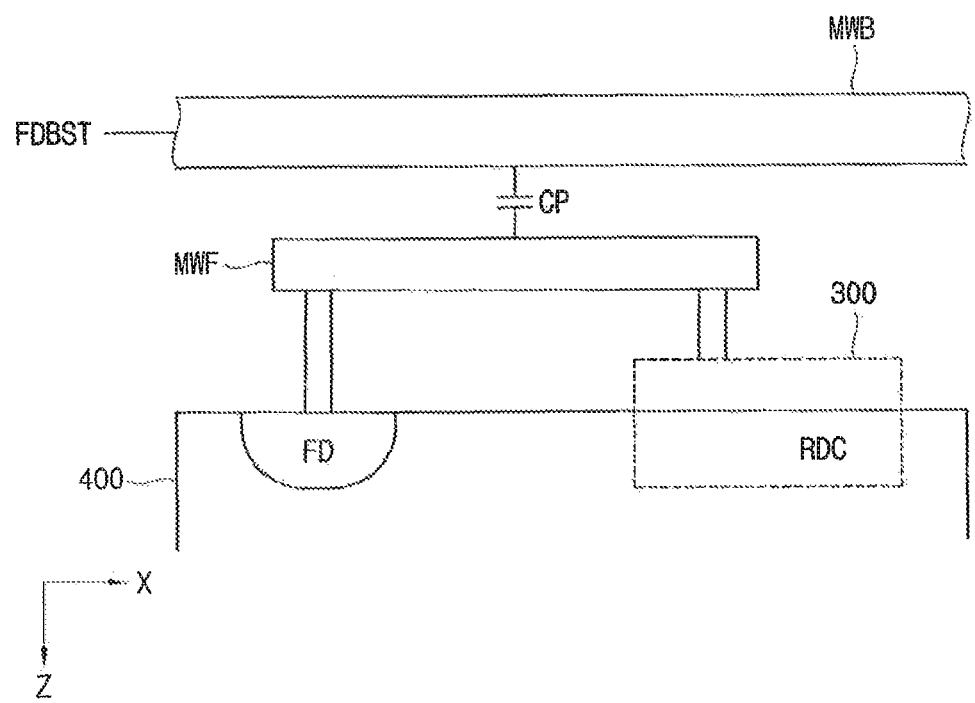
FIG. 12 is a diagram illustrating an example of a wire structure formed over a semiconductor substrate.

FIG. 12 is a diagram illustrating an example of a wire structure formed over a semiconductor substrate.

Referring to FIG. 12, the floating diffusion node FD and the read circuit (RDC) 300 are formed on the semiconductor substrate 400. The other components such as photodiodes, transfer gates, etc. are omitted in FIG. 12 for convenience of illustration. A read wire MWF connected to the floating diffusion node FD and a neighboring wire MWB near the read wire MWF may be disposed over the semiconductor substrate 400. For example, the read wire MWF may be a wire to apply the reset voltage VRST or a wire to transfer the voltage of the floating diffusion node FD to the gate of the driving transistor MD.

FIG. 12 illustrates a non-limiting example where the neighboring wire MWB is disposed over the read wire MWF such that the neighboring wire MWB and the read wire MWF are arranged in a vertical direction Z. However, the neighboring wire MWB and the read wire MWF may also be arranged in a horizontal direction X. The neighboring wire MWB and the read wire MWF may be sufficiently adjacent for capacitive coupling between the wires MWF and MWB, and the parasitic capacitance between the wires MWF and MWB is represented by CP. Using such capacitive coupling, the voltage of the floating diffusion node FD may be boosted by controlling a boost signal FDBST applied to the neighboring wire MWB.

Figure 14:
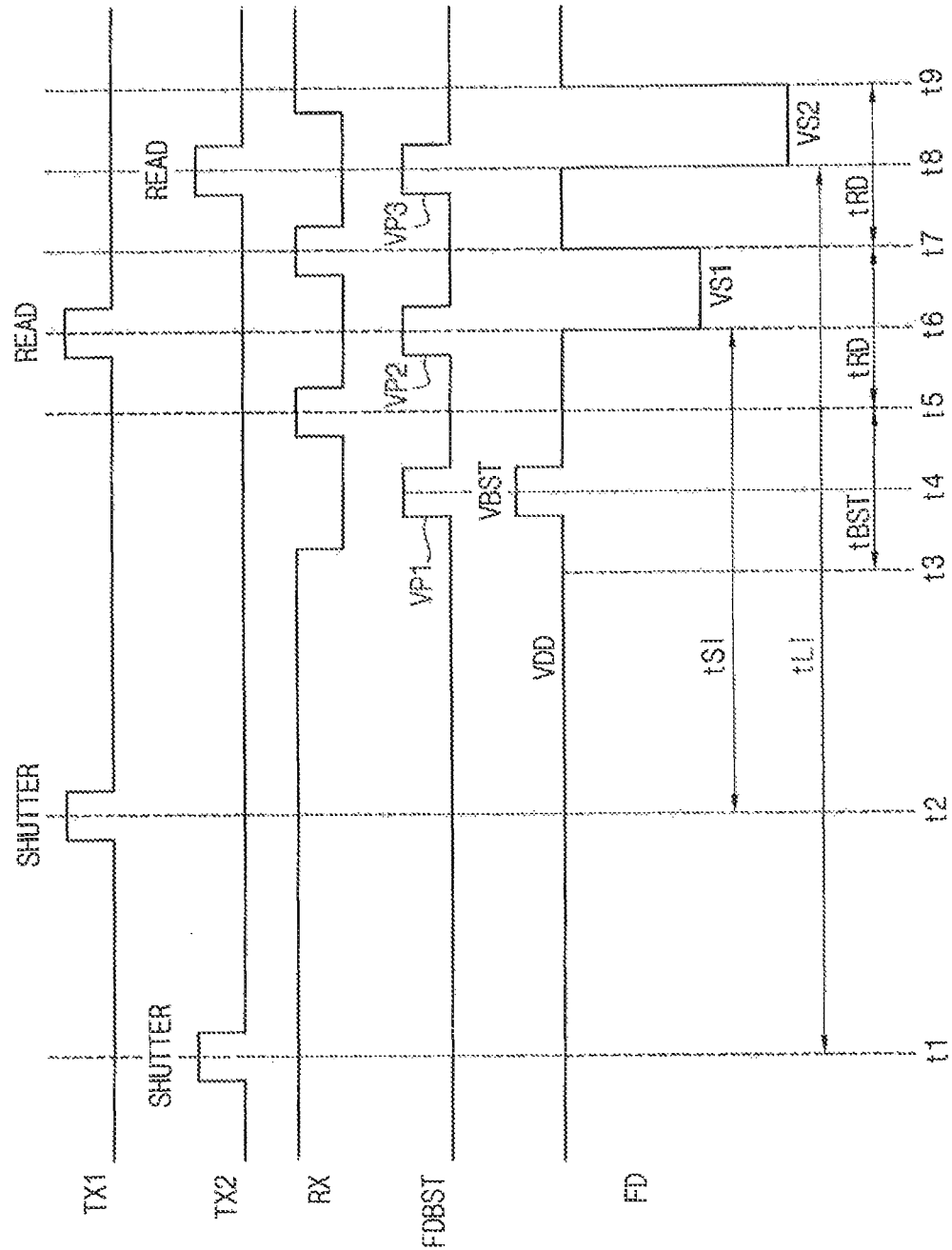

FIGS. 13 and 14 are timing diagrams illustrating a method of operating an image sensor using the wire structure of FIG. 12 according to an exemplary embodiment of the inventive concept.

Referring to FIGS. 2, 3, 4, 12, and 13, the first pixel 210 may be a short exposure pixel having a first integration time tSI and the second pixel 220 may be a long exposure pixel having a second integration time tLI, which is longer than the first integration time tSI. With reference to these figures, the first pixel 210 and the second pixel 220 may be interchangeably referred to as the short exposure pixel 210 and the long exposure pixel 220, respectively.

At time point t1, the second transfer signal TX2 of the long exposure pixel 220 is activated as a pulse to start the second integration time tLI. At time point t2, the first transfer signal TX1 of the short exposure pixel 210 is activated as a pulse to start the first integration time tSI. At time points t1 and t2, the reset signal RX may be activated, as illustrated in FIG. 13, to turn on the reset transistor MR and thus the floating diffusion node FD and the photodiodes PD1 and PD2 may be reset to the first voltage VDD.

The voltage of the floating diffusion node FD is boosted during a boosting time tBST corresponding to time interval t3~t5. The first image signal VS1 corresponding to the photocharges integrated in the short exposure pixel 210 is read during a read time tRD corresponding to time interval t5~t7. The second image signal VS2 corresponding to the photocharges integrated in the long exposure pixel 220 is read during the read time tRD corresponding to time interval t7~t9.

At time point t3, to start the boosting operation, the reset transistor MR may be turned on to apply the first voltage VDD, corresponding to the reset level, to the floating diffusion node FD. As illustrated in FIG. 13, the reset transistor MR may be turned on continuously by activating the reset signal RX before time point t3. Within time interval t3~t4, the reset transistor MR may be turned off to float the floating diffusion node FD that has the first voltage VDD. At time t4, a voltage pulse VP may be applied through the boost signal FDBST to the neighboring wire MWB while the floating diffusion node FD and the read wire MWF are floated, and the voltage of the floating diffusion node FD is increased from the first voltage VDD to the second voltage VBST due to the voltage pulse VP. The second voltage VBST may be increased as the parasitic capacitance CP between the wires MWF and MWB is increased.

As such, around time point t4, the voltage of the floating diffusion node FD is increased from the first voltage VDD, corresponding to the reset level, to the second voltage VBST, which is higher than the first voltage VDD, and then the voltage of the floating diffusion node FD is restored from the second voltage VBST to the first voltage VDD. As illustrated in FIG. 13, the voltage of the floating diffusion node FD may be boosted during the first integration time tSI of the first pixel 210 and the second integration time tLI of the second pixel 220.

At time point t6, the first transfer signal TX1 of the short exposure pixel 210 is activated as a pulse, the first integration time tSI is finished, and the voltage of the floating diffusion node FD is changed to a level corresponding to the first image signal VS1. At time point t8, the second transfer signal TX2 of the long exposure pixel 220 is activated as a pulse, the second integration time tLI is finished, and the voltage of the floating diffusion node FD is changed to a level corresponding to the second image signal VS2. At time points t6 and t8, the reset signal RX may be deactivated to turn off the reset transistor MR and thus the floating diffusion node FD is separated from the reset voltage VRST.

As such, the voltage of the floating diffusion node FD may be boosted from the first voltage VDD to the second voltage VBST, which is higher than the first voltage VDD, during the pulse duration of the voltage pulse VP using the capacitive coupling between the read wire MWF and the neighboring wire MWB, and thus the blooming effect on the image signal of the short exposure pixel caused by the saturated photocharges of the long exposure pixel may be reduced.

The method of FIG. 14 is similar to the method of FIG. 13, and repeated descriptions are omitted.

Referring to FIG. 14, a first voltage pulse VP1 is applied at time point t4 as described with reference to FIG. 13. In addition, a second voltage pulse VP2 and a third voltage pulse VP3 are applied at time points t6 and t8, respectively.

At time point t6, the first transfer gate TG1 of the short exposure pixel 210 is turned on to transfer the photocharges integrated in the first photodiode PD1 to the floating diffusion node FD. In addition, the second voltage pulse VP2 is applied to the neighboring wire MWB through the boost signal FDBST at time point t6 while the first transfer gate TG1 is turned on.

At time point t8, the second transfer gate TG2 of the long exposure pixel 220 is turned on to transfer the photocharges integrated in the second photodiode PD2 to the floating diffusion node FD. In addition, the third voltage pulse VP3 is applied to the neighboring wire MWB through the boost signal FDBST at time point t8 while the second transfer gate TG2 is turned on.

Figure 15:
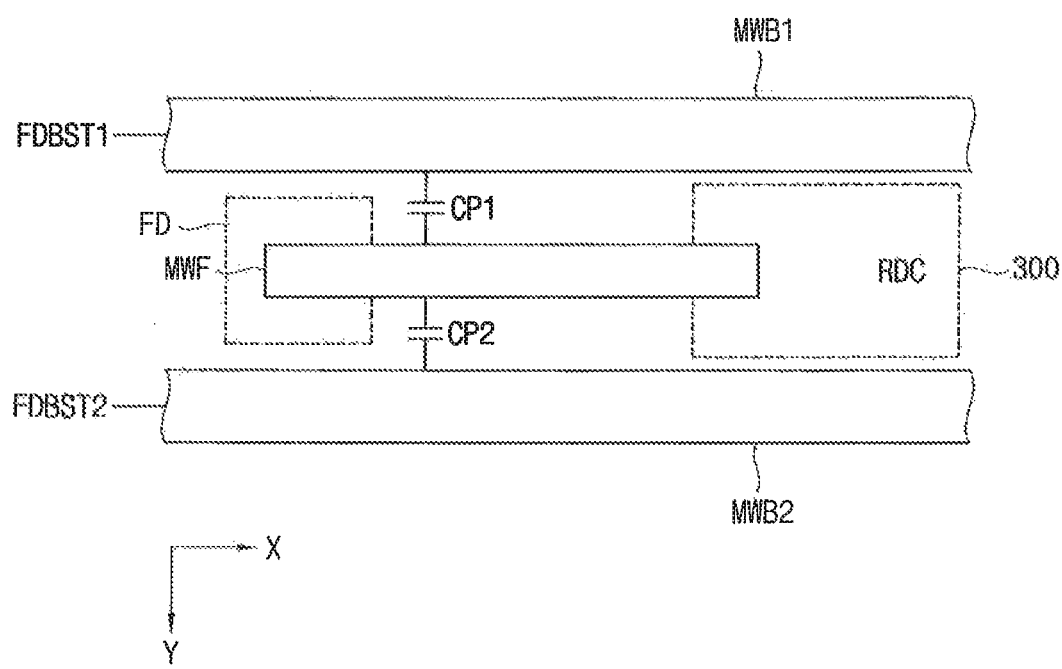
FIG. 15 is a diagram illustrating an example of a wire structure formed over a semiconductor substrate.

FIG. 15 is a diagram illustrating an example of a wire structure formed over a semiconductor substrate.

Referring to FIG. 15, the floating diffusion node FD and the read circuit (RDC) 300 are formed on the semiconductor substrate 400 (not shown). The other components such as photodiodes, transfer gates, etc. are omitted in FIG. 15 for convenience of illustration. A read wire MWF connected to the floating diffusion node FD, a first neighboring wire MWB1, and a second neighboring wire MWB2 near the read wire MWF may be disposed over the semiconductor substrate 400. For example, the read wire MWF may be a wire to apply the reset voltage VRST or a wire to transfer the voltage of the floating diffusion node FD to the gate of the driving transistor MD.

FIG. 15 illustrates a non-limiting example where the first and second neighboring wires MWB1 and MWB2 are disposed at both sides of the read wire MWF such that the neighboring wires MWB1 and MWB2 and the read wire MWF are arranged in the horizontal direction X. However, at least one of the neighboring wires MWB1 and MWB2 may be disposed over or under the read wire MWF. The neighboring wires MWB1 and MWB2 may be sufficiently adjacent to the read wire MWF for capacitive coupling between the wires MWF, MWB1, and MWB2, and the parasitic capacitances between the wires MWF and MWB1 and the wires MWF and MWB2 are represented by CP1 and CP2, respectively. Using such capacitive coupling, the voltage of the floating diffusion node FD may be boosted by controlling boost signals FDBST1 and FDBST2 applied to the neighboring wires MWB1 and MWB2.

Figure 16:
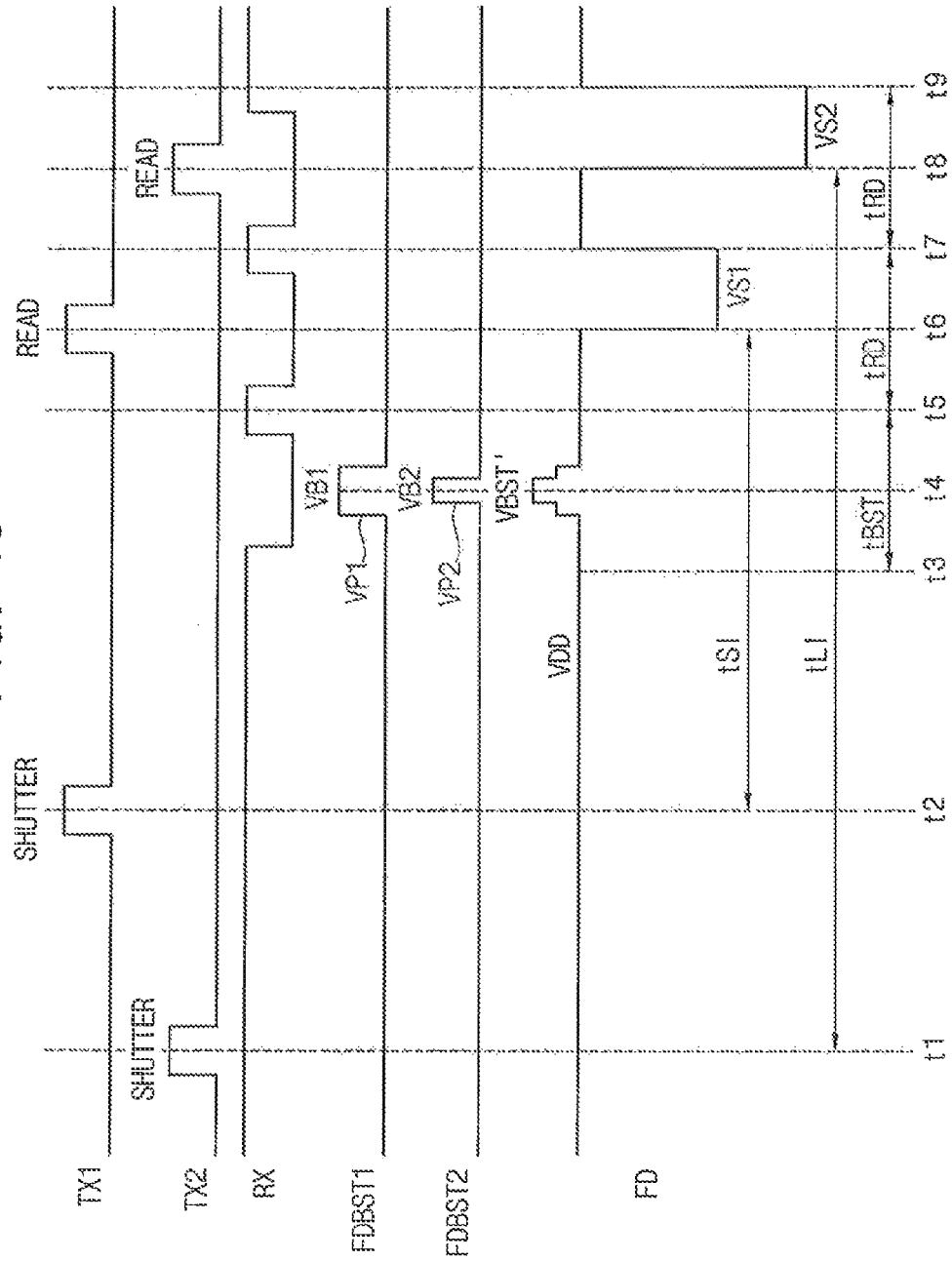
FIG. 16 is a timing diagram illustrating a method of operating an image sensor using the wire structure of FIG. 15 according to an exemplary embodiment of the inventive concept.

FIG. 16 is a timing diagram illustrating a method of operating an image sensor using the wire structure of FIG. 15 according to an exemplary embodiment of the inventive concept.

Referring to FIGS. 2, 3, 4, 15, and 16, the first pixel 210 may be a short exposure pixel having a first integration time tSI and the second pixel 220 may be a long exposure pixel having a second integration time tLI, which is longer than the first integration time tSI. With reference to these figures, the first pixel 210 and the second pixel 220 may be interchangeably referred to as the short exposure pixel 210 and the long exposure pixel 220, respectively.

At time point t1, the second transfer signal TX2 of the long exposure pixel 220 is activated as a pulse to start the second integration time tLI. At time point t2, the first transfer signal TX1 of the short exposure pixel 210 is activated as a pulse to start the first integration time tSI. At time points t1 and t2, the reset signal RX may be activated, as illustrated in FIG. 13, to turn on the reset transistor MR and thus the floating diffusion node FD and the photodiodes PD1 and PD2 may be reset to the first voltage VDD.

The voltage of the floating diffusion node FD is boosted during a boosting time tBST corresponding to time interval t3~t5. The first image signal VS1 corresponding to the photocharges integrated in the short exposure pixel 210 is read during a read time tRD corresponding to time interval t5~t7. The second image signal VS2 corresponding to the photocharges integrated in the long exposure pixel 220 is read during the read time tRD corresponding to time interval t7~t9.

At time point t3, to start the boosting operation, the reset transistor MR may be turned on to apply the first voltage VDD corresponding to the reset level to the floating diffusion node FD. The reset transistor MR may be turned on by activating the reset signal RX. As illustrated in FIG. 16, the reset transistor MR may remain continuously on before time point t3.

Within time interval t3~t4, the reset transistor MR may be turned off to float the floating diffusion node FD that has the first voltage VDD. At time t4, a first voltage pulse VP1 may be applied through the first boost signal FDBST1 to the first neighboring wire MWB1 while the floating diffusion node FD and the read wire MWF are floated. In addition, at time t4, a second voltage pulse VP2 may be applied through the second boost signal FDBST2 to the second neighboring wire MWB2 while the floating diffusion node FD and the read wire MWF are floated.

To increase the voltage boosting effect, at least a portion of a pulse duration of the first voltage pulse VP1 may be overlapped with at least a portion of a pulse duration of the second voltage pulse VP2, as illustrated in FIG. 16. The voltage of the floating diffusion node FD is increased from the first voltage VDD to the second voltage VBST' due to the voltage pulses VP1 and VP2. The second voltage VBST' may be increased as the parasitic capacitances CP1 and CP2 between the wires MWF, MWB1, and MWB2 are increased.

As such, around time point t4, the voltage of the floating diffusion node FD is increased from the first voltage VDD, corresponding to the reset level, to the second voltage VBST', higher than the first voltage VDD, and then the voltage of the floating diffusion node FD is restored from the second voltage VBST' to the first voltage VDD. As illustrated in FIG. 16, the voltage of the floating diffusion node FD may be boosted during the first integration time tSI of the first pixel 210 and the second integration time tLI of the second pixel 220.

At time point t6, the first transfer signal TX1 of the short exposure pixel 210 is activated as a pulse, the first integration time tSI is finished, and the voltage of the floating diffusion node FD is changed to a level corresponding to the first image signal VS1. At time point t8, the second transfer signal TX2 of the long exposure pixel 220 is activated as a pulse, the second integration time tLI is finished, and the voltage of the floating diffusion node FD is changed to a level corresponding to the second image signal VS2. At time points t6 and t8, the reset signal RX may be deactivated to turn off the reset transistor MR and thus the floating diffusion node FD is separated from the reset voltage VRST.

As such, the voltage of the floating diffusion node FD may be boosted from the first voltage VDD to the second voltage VBST', which is higher than the first voltage VDD, during the pulse durations of the voltage pulses VP1 and VP2 using the capacitive coupling between the read wire MWF and the neighboring wires MWB1 and MWB2, and thus the blooming effect on the image signal of the short exposure pixel caused by the saturated photocharges of the long exposure pixel may be reduced.

Figure 17:
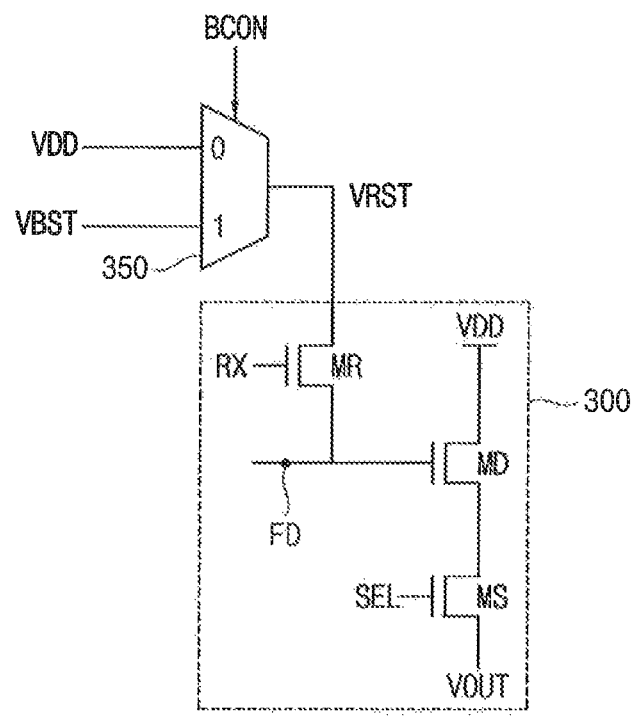
FIG. 17 is a diagram illustrating an example configuration for providing a reset voltage to a read circuit according to an exemplary embodiment of the inventive concept.

FIG. 17 is a diagram illustrating an example configuration for providing a reset voltage to a read circuit according to an exemplary embodiment of the inventive concept.

Referring to FIG. 17, a voltage selector 350 may be used to change the reset voltage VRST provided to the read circuit 300. For example, the voltage selector 350 may select and output the first voltage VDD as the reset voltage VRST when a control signal BCON is deactivated in a logical low level, and may select and output the second voltage VBST, which is higher than the first voltage VDD, when the control signal BCON is activated in a logical high level. The first voltage VDD and the second voltage VBST may be provided from the voltage generator 70 in FIG. 2 and the control signal BCON may be provided from the controller 60 in FIG. 2. The voltage boosting operation of the floating diffusion node FD may be performed by controlling the reset voltage VBST as described with reference to FIG. 18.

Figure 18:
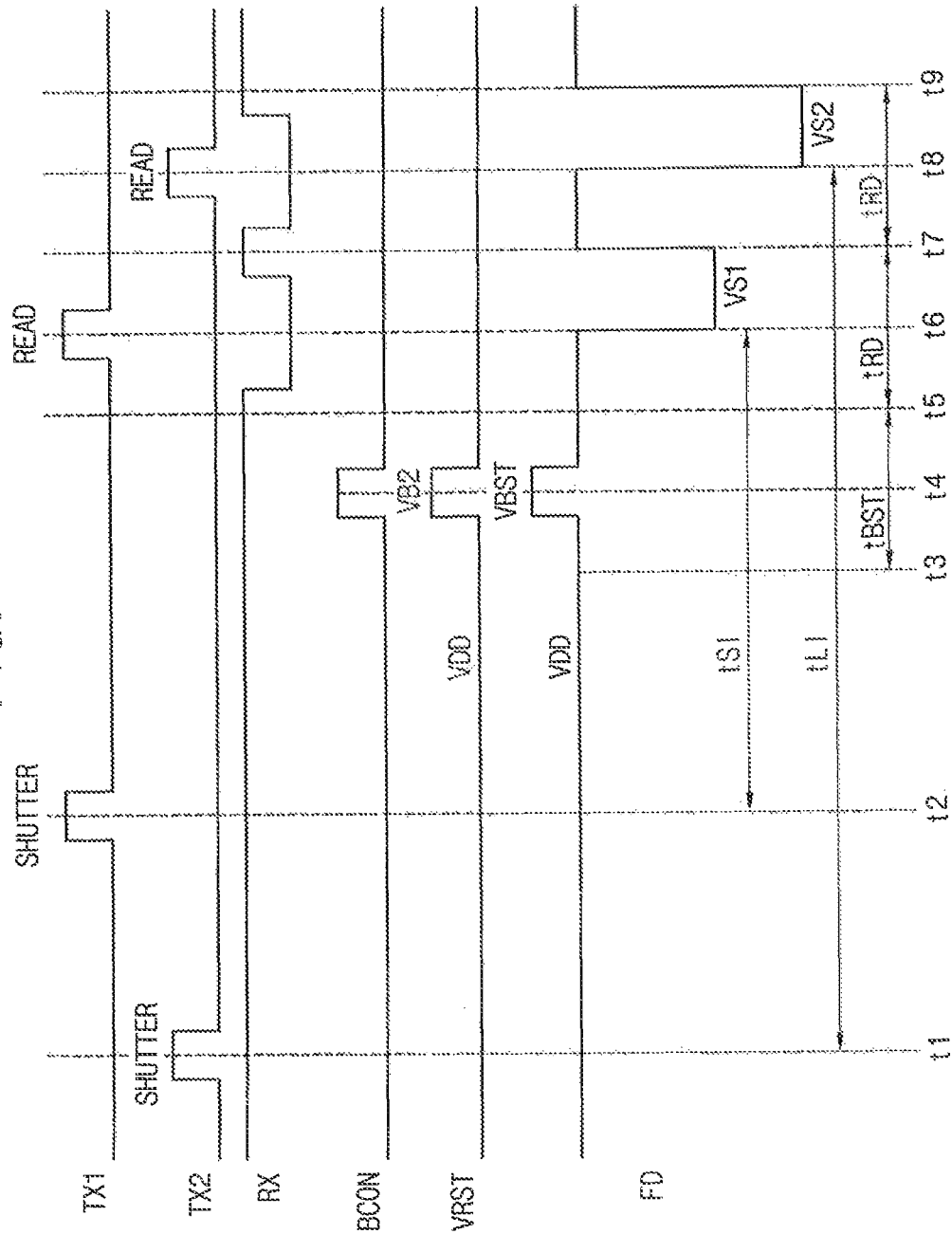
FIG. 18 is a timing diagram illustrating a method of operating an image sensor using the configuration of FIG. 17 according to an exemplary embodiment of the inventive concept.

FIG. 18 is a timing diagram illustrating a method of operating an image sensor using the configuration of FIG. 17 according to an exemplary embodiment of the inventive concept.

Referring to FIGS. 2, 3, 4, 17, and 18, the first pixel 210 may be a short exposure pixel having a first integration time tSI and the second pixel 220 may be a long exposure pixel having a second integration time tLI longer than the first integration time tSI. With reference to these figures, the first pixel 210 and the second pixel 220 may be interchangeably referred to as the short exposure pixel 210 and the long exposure pixel 220, respectively.

At time point t1, the second transfer signal TX2 of the long exposure pixel 220 is activated as a pulse to start the second integration time tLI. At time point t2, the first transfer signal TX1 of the short exposure pixel 210 is activated as a pulse to start the first integration time tSI. At time points t1 and t2, the reset signal RX may be activated, as illustrated in FIG. 13, to turn on the reset transistor MR and thus the floating diffusion node FD and the photodiodes PD1 and PD2 may be reset to the first voltage VDD.

The voltage of the floating diffusion node FD is boosted during a boosting time tBST corresponding to time interval t3~t5. The first image signal VS1 corresponding to the photocharges integrated in the short exposure pixel 210 is read during a read time tRD corresponding to time interval t5~t7. The second image signal VS2 corresponding to the photocharges integrated in the long exposure pixel 220 is read during the read time tRD corresponding to time interval t7~t9.

At time point t4, the control signal BCON is activated as a pulse. The voltage selector 350 in FIG. 17 changes the reset voltage VRST from the first voltage VDD to the second voltage VBST and then restores the reset voltage VRST from the second voltage VBST to the first voltage VDD. Such changes of the reset voltage VRST are performed while the reset transistor MR, which applies the reset voltage VRST to the floating diffusion node FD, is turned on.

As such, around time point t4, the voltage of the floating diffusion node FD is increased from the first voltage VDD, corresponding to the reset level, to the second voltage VBST, which is higher than the first voltage VDD, and then the voltage of the floating diffusion node FD is restored from the second voltage VBST to the first voltage VDD. As illustrated in FIG. 18, the voltage of the floating diffusion node FD may be boosted during the first integration time tSI of the first pixel 210 and the second integration time tLI of the second pixel 220.

At time point t6, the first transfer signal TX1 of the short exposure pixel 210 is activated as a pulse, the first integration time tSI is finished, and the voltage of the floating diffusion node FD is changed to a level corresponding to the first image signal VS1. At time point t8, the second transfer signal TX2 of the long exposure pixel 220 is activated as a pulse, the second integration time tLI is finished, and the voltage of the floating diffusion node FD is changed to a level corresponding to the second image signal VS2. At time points t6 and t8, the reset signal RX may be deactivated to turn off the reset transistor MR and thus the floating diffusion node FD is separated from the reset voltage VRST.

As such, the voltage of the floating diffusion node FD may be boosted from the first voltage VDD to the second voltage VBST, which is higher than the first voltage VDD, during the pulse durations of the voltage pulses VP1 and VP2 by controlling the reset voltage VRST, and thus the blooming effect on the image signal of the short exposure pixel caused by the saturated photocharges of the long exposure pixel may be reduced.

Figure 19:
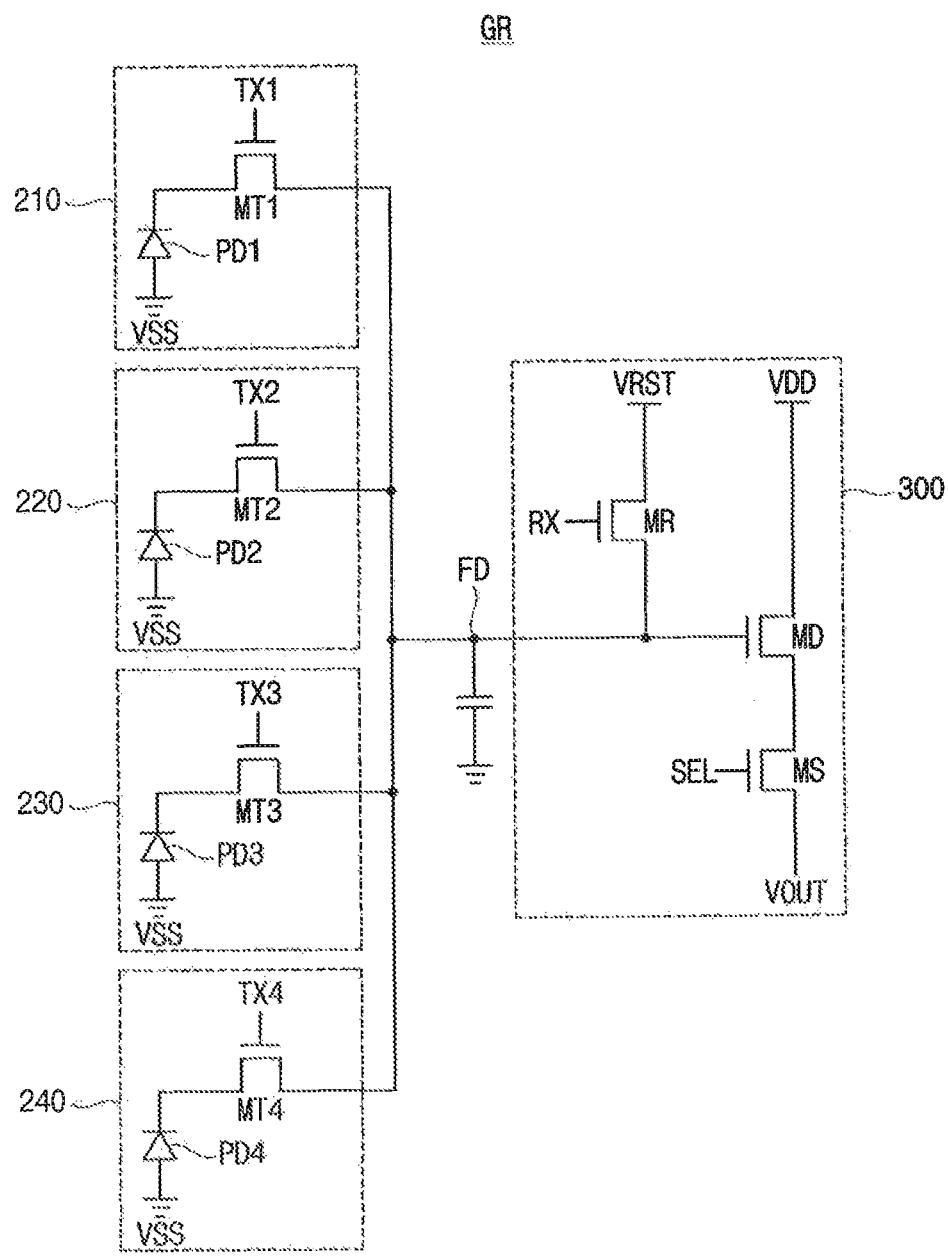
FIG. 19 is a circuit diagram illustrating a shared structure in which four pixels are commonly connected to a single floating diffusion node.
Figure 20:
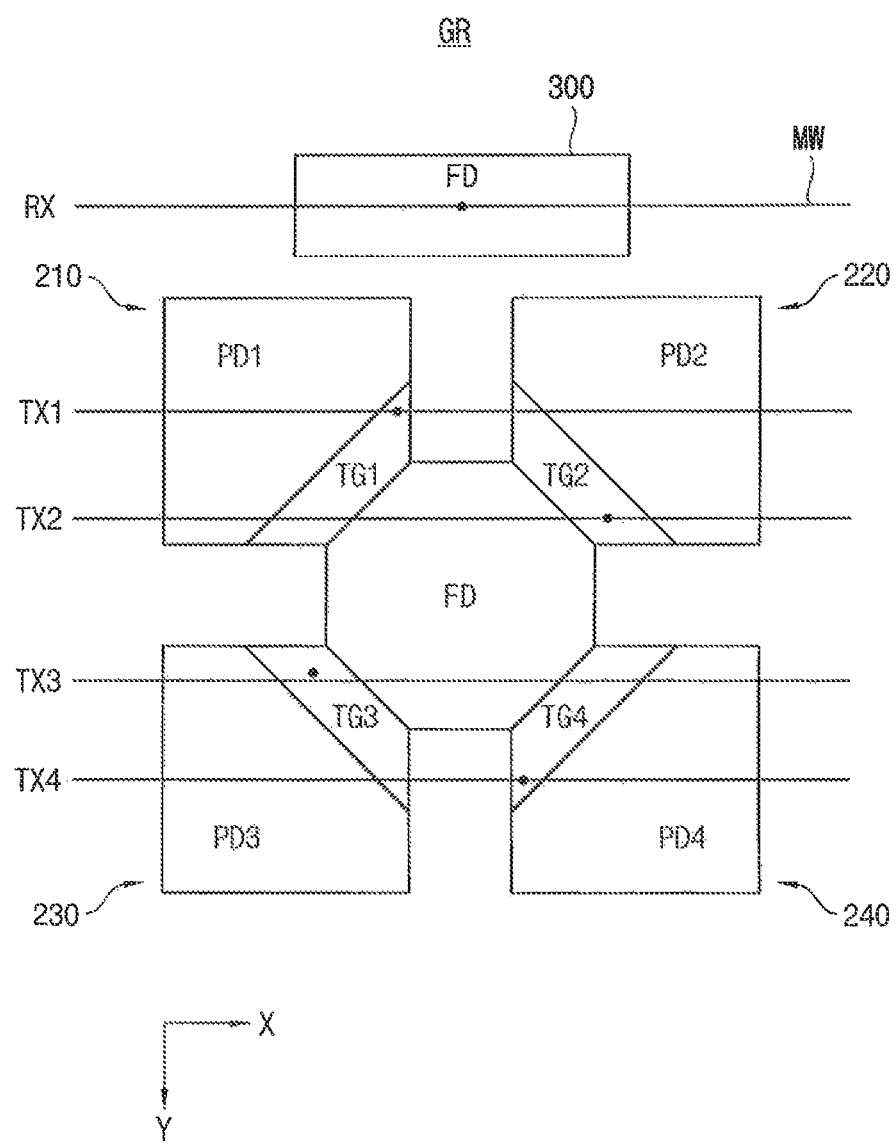
FIG. 20 is a top view illustrating an example of a shared structure in which four pixels are commonly connected to a single floating diffusion node.

FIG. 19 is a circuit diagram illustrating a shared structure in which four pixels are commonly connected to a single floating diffusion node, and FIG. 20 is a top view illustrating an example of a shared structure in which four pixels are commonly connected to a single floating diffusion node.

Referring to FIGS. 19 and 20, a pixel group GR may include a floating diffusion node FD, a first pixel 210, a second pixel 220, a third pixel 230, a fourth pixel 240, and a read circuit 300. The first pixel 210, the second pixel 220, the third pixel 230, and the fourth pixel 240 may be commonly connected to the floating diffusion node FD. The pixel group GR, as illustrated in FIGS. 19 and 20, may be arranged repeatedly in a row direction and a column direction in the pixel array 20 in FIG. 2.

Control signals TX1, TX2, TX3, TX4, and RX may be provided from the row driver 30 through wires MW extended in the row direction X.

The first pixel 210 may include a first photodiode PD1 and a first transfer transistor MT1. The second pixel 220 may include a second photodiode PD2 and a second transfer transistor MT2. The third pixel 230 may include a third photodiode PD3 and a third transfer transistor MT3. The fourth pixel 240 may include a fourth photodiode PD4 and a fourth transfer transistor MT4. The read circuit 300 may include a reset transistor MR, a source follower transistor or a driving transistor MD, and a selection transistor MS. FIG. 19 illustrates a non-limiting example where each pixel includes one transistor and the read circuit includes three transistors, but the method according to exemplary embodiments may be applied to operate an image sensor of various configurations other than that of FIG. 19.

Figure 21:
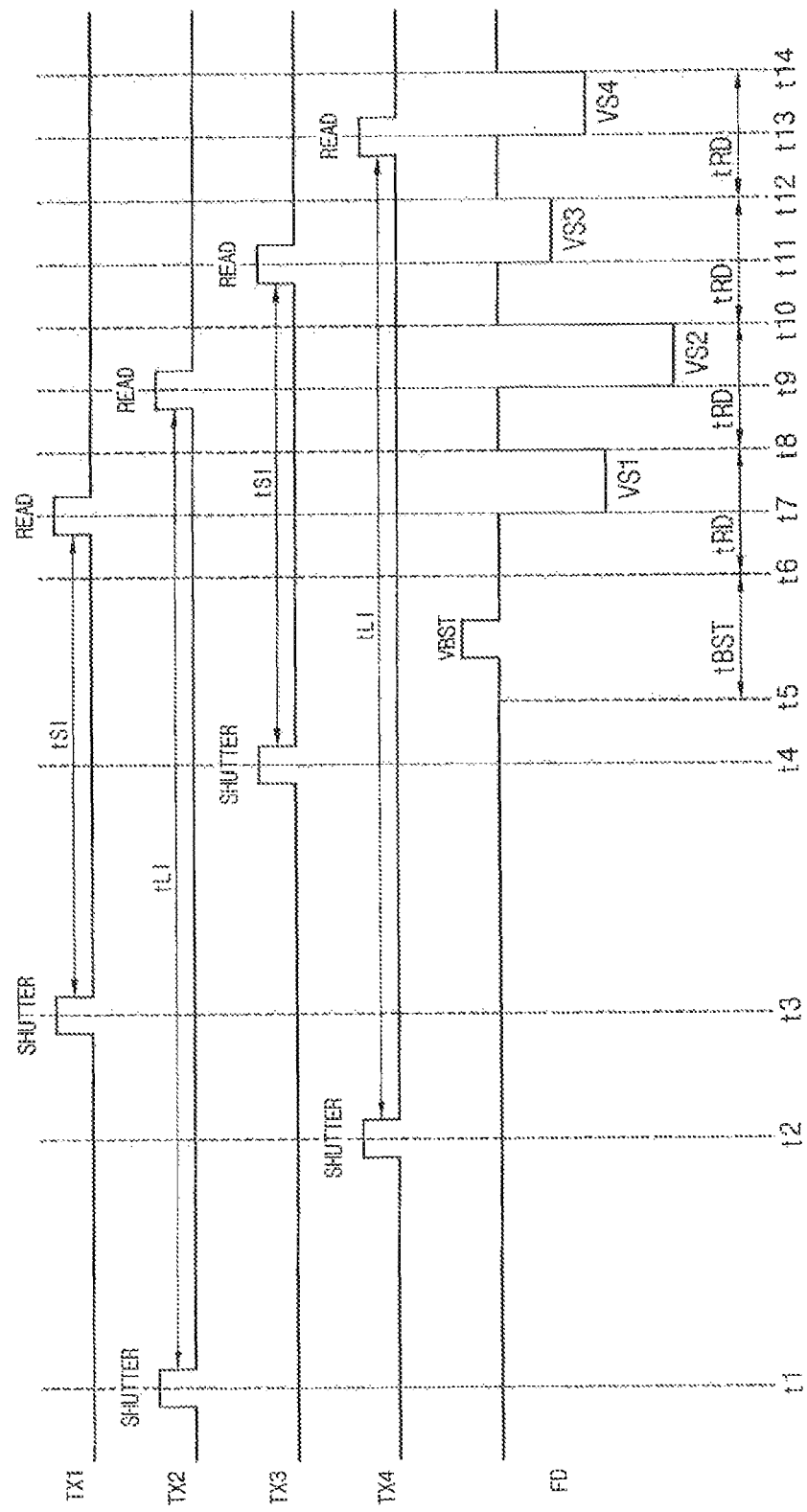
FIG. 21 is a timing diagram illustrating a method of operating an image sensor according to an exemplary embodiment of the inventive concept.

FIG. 21 is a timing diagram illustrating a method of operating an image sensor according to an exemplary embodiment of the inventive concept.

Referring to FIGS. 2, 19, 20, and 21, the first pixel 210 and the third pixel 230 may be short exposure pixels having a first integration time tSI and the second pixel 220 and the fourth pixel 240 may be long exposure pixels having a second integration time tLI, which is longer than the first integration time tSI. The first and third image signals VS1 and VS3 may correspond to the photocharges integrated in the first pixel 210 and the third pixel 230, respectively, during the first integration time tSI. The second and fourth image signals VS2 and VS4 may correspond to the photocharges integrated in the second first pixel 220 and the fourth pixel 220, respectively, during the second integration time tLI.

At time point t1, the second transfer signal TX2 of the second pixel 220 is activated as a pulse to start the second integration time tLI. At time point t2, the fourth transfer signal TX4 of the fourth pixel 240 is activated as a pulse to start the second integration time tLI. At time point t3, the first transfer signal TX1 of the first pixel 210 is activated as a pulse to start the first integration time tSI. At time point t4, the third transfer signal TX3 of the third pixel 230 is activated as a pulse to start the first integration time tSI.

At time points t1, t2, t3, and t4, the reset signal RX may be activated as described above to turn on the reset transistor MR and thus the floating diffusion node FD and the photodiodes PD1, PD2, PD3, and PD4 may be reset to the first voltage VDD.

The voltage of the floating diffusion node FD is boosted during a boosting time tBST corresponding to time interval t5~t6. The first image signal VS1 corresponding to the photocharges integrated in the first pixel 210 is read during a read time tRD corresponding to time interval t6~t8. The second image signal VS2 corresponding to the photocharges integrated in the second pixel 220 is read during the read time tRD corresponding to time interval t8~10. The third image signal VS3 corresponding to the photocharges integrated in the third pixel 230 is read during the read time tRD corresponding to time interval t10~t12. The fourth image signal VS4 corresponding to the photocharges integrated in the fourth pixel 240 is read during the read time tRD corresponding to time interval t12~t14.

During time interval t5~t6, the voltage of the floating diffusion node FD is increased from the first voltage VDD, corresponding to a reset level, to the second voltage VBST, which is higher than the first voltage VDD, and then the voltage of the floating diffusion node FD is restored from the second voltage VBST to the first voltage VDD. As illustrated in FIG. 21, the voltage of the floating diffusion node FD may be boosted during the integration times of the first pixel 210, the second pixel 220, the third pixel 230, and the fourth pixel 240.

In some exemplary embodiments, the voltage boosting operation may be performed using capacitive coupling between wires as previously described with reference to FIGS. 12 through 16. In other exemplary embodiments, the voltage boosting operation may be performed by changing the reset voltage VRST between the first voltage VDD and the second voltage VBST as previously described with reference to FIGS. 17 and 18.

The operations during time interval t6~t14 are similar to those of FIG. 5 and repeated descriptions are omitted.

The short exposure pixels and the long exposure pixels may be determined in different manners. For example, in contrast to FIG. 21, the first pixel 210 and the second pixel 220 may be short exposure pixels having the first integration time tSI, and the third pixel 230 and the fourth pixel 240 may be long exposure pixels having the second integration time tLI. The first and second image signals VS1 and VS2 may correspond to the photocharges integrated in the first pixel 210 and the second pixel 220, respectively, during the first integration time tSI. The third and fourth image signals VS3 and VS4 may correspond to the photocharges integrated in the third first pixel 230 and the fourth pixel 240, respectively, during the second integration time tLI.

Figure 22:
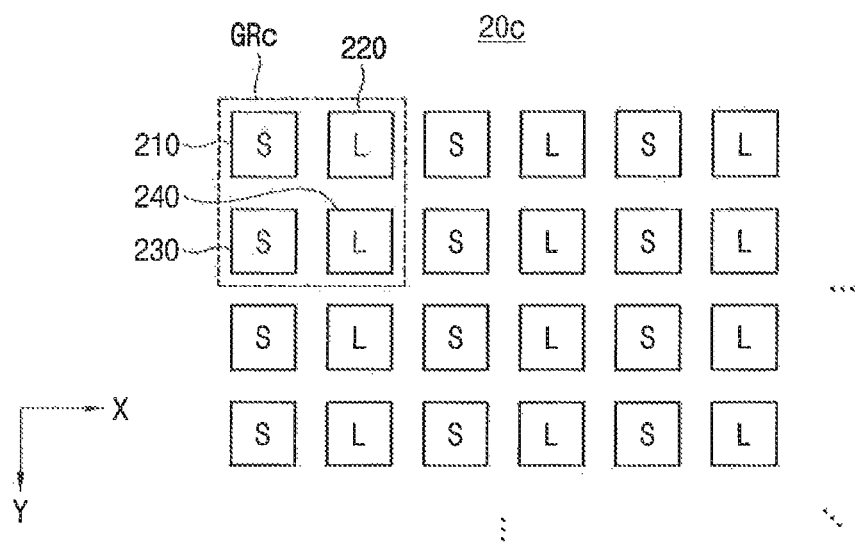
FIGS. 22, 23, and 24 are diagrams for describing operations of a pixel array having the shared structure of FIG. 21.
Figure 23:
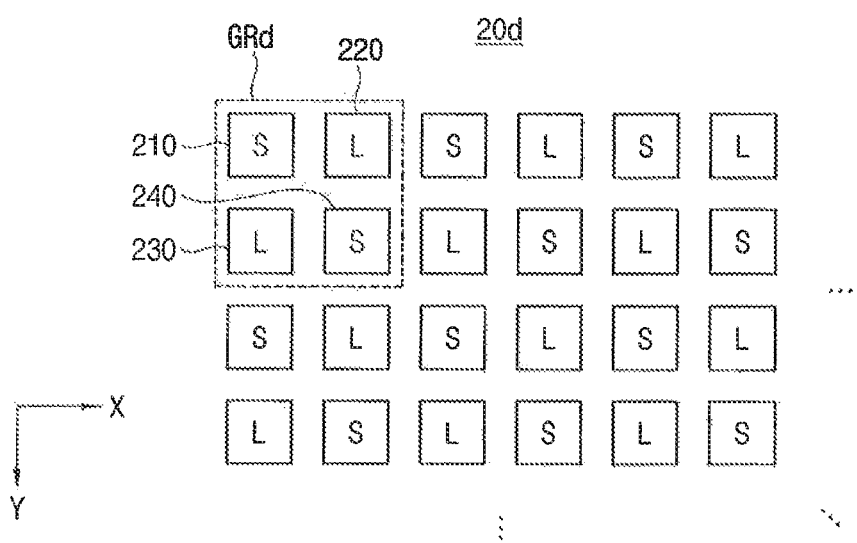
Figure 24:
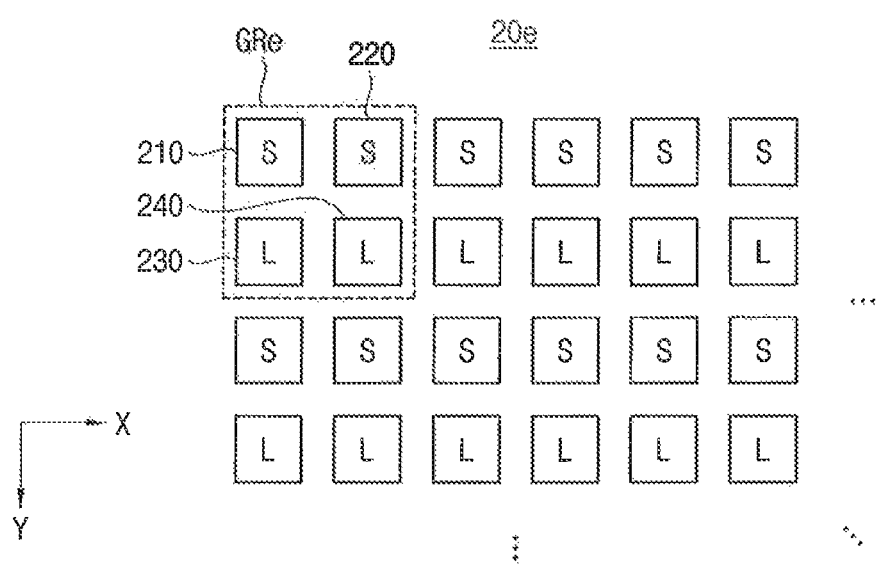

FIGS. 22, 23, and 24 are diagrams for describing operations of a pixel array having the shared structure of FIG. 21.

FIGS. 22, 23, and 24 illustrate examples where the first through fourth pixels 210, 220, 230, and 240 sharing the floating diffusion node FD are arranged in a 2×2 matrix.

In the pixel group GRc in FIG. 22, the first pixel 210 and the third pixel 230 correspond to the short exposure pixels S having the first integration time tSI, and the second pixel 220 and the fourth pixel 240 correspond to the long exposure pixels L having the second integration time tLI. In this case, the short exposure pixels S and the long exposure pixels L may be alternatively arranged column by column as illustrated in FIG. 22.

In the pixel group GRd in FIG. 23, the first pixel 210 and the fourth pixel 240 correspond to the short exposure pixels S having the first integration time tSI, and the second pixel 220 and the third pixel 230 correspond to the long exposure pixels L having the second integration time tLI. In this case, the short exposure pixels S and the long exposure pixels L may be alternatively arranged in a diagonal direction as illustrated in FIG. 23.

In the pixel group GRe in FIG. 24, the first pixel 210 and the second pixel 220 correspond to the short exposure pixels S having the first integration time tSI, and the third pixel 230 and the fourth pixel 240 correspond to the long exposure pixels L having the second integration time tLI. In this case, the short exposure pixels S and the long exposure pixels L may be alternatively arranged row by row as illustrated in FIG. 24.

Figure 25:
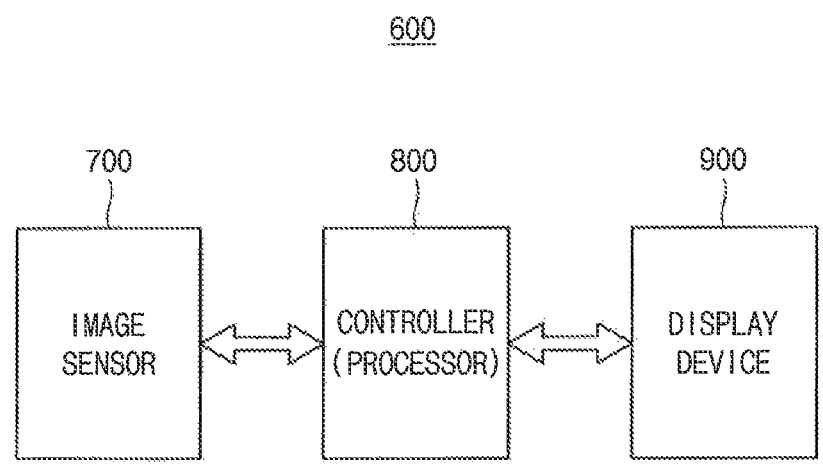
FIG. 25 is a block diagram illustrating an example of an imaging system including an image sensor according to an exemplary embodiment of the inventive concept.

FIG. 25 is a block diagram illustrating an example of an imaging system including an image sensor according to an exemplary embodiment of the inventive concept.

Referring to FIG. 25, an imaging system 600 may include an image sensor 700, a controller (or a processor) 800, and a display device 900. As illustrated in FIG. 25, the image sensor 700 may be coupled to the display device 900 via the controller 800. Therefore, the display device 900 may display images based on image signals from the image sensor 700.

As described with reference to FIGS. 1 through 24, the image sensor 700 may include a pixel array having a shared structure in which a plurality of pixels are connected to a single floating diffusion node. The image sensor 700 may boost the voltage of the floating diffusion node and then sequentially read the image signals of the pixels commonly connected to the floating diffusion node. The blooming effect on the image signal of short exposure pixels caused by the saturated photocharges of long exposure pixels may be reduced by boosting the voltage of the floating diffusion node before reading the image signals.

Figure 26:
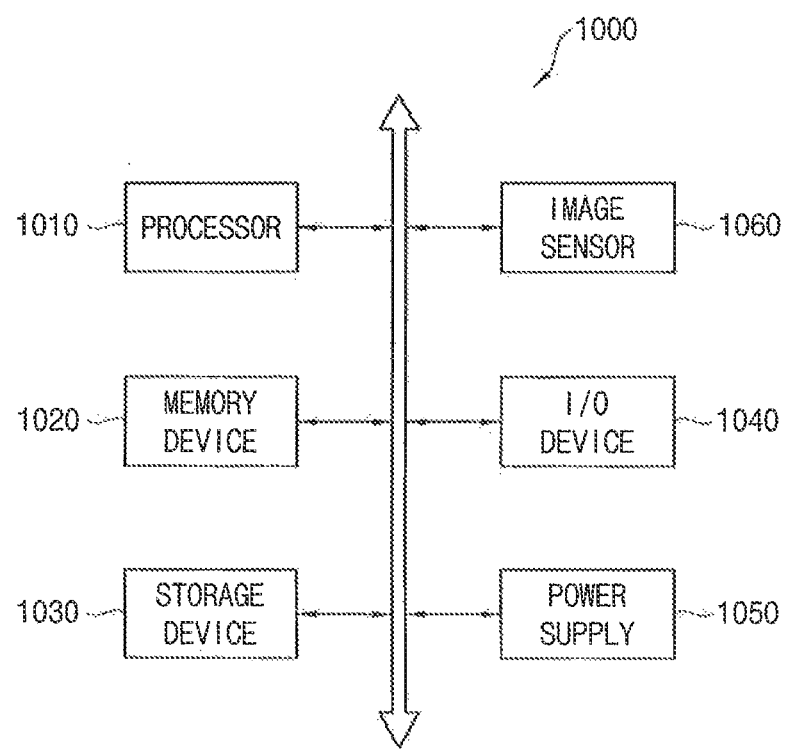
FIG. 26 is a block diagram illustrating an electronic device according to an exemplary embodiment of the inventive concept.
Figure 27:
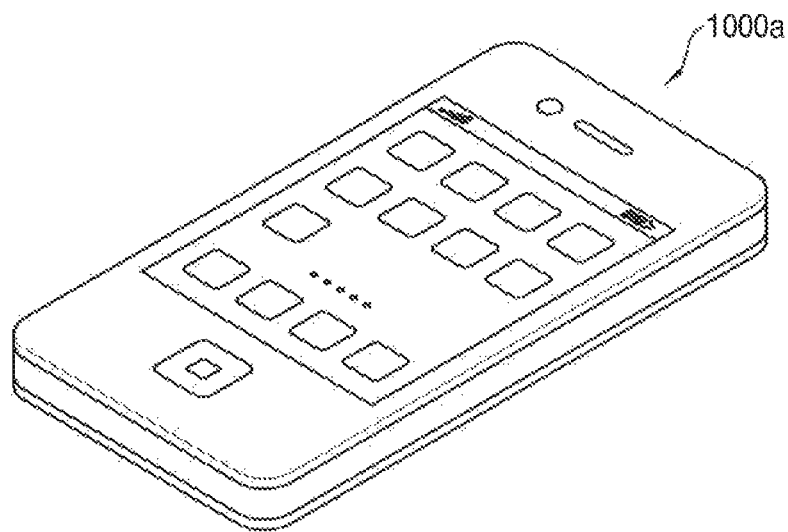
FIG. 27 is a diagram illustrating a smart phone in which the electronic device of FIG. 26 is implemented.
Figure 28:
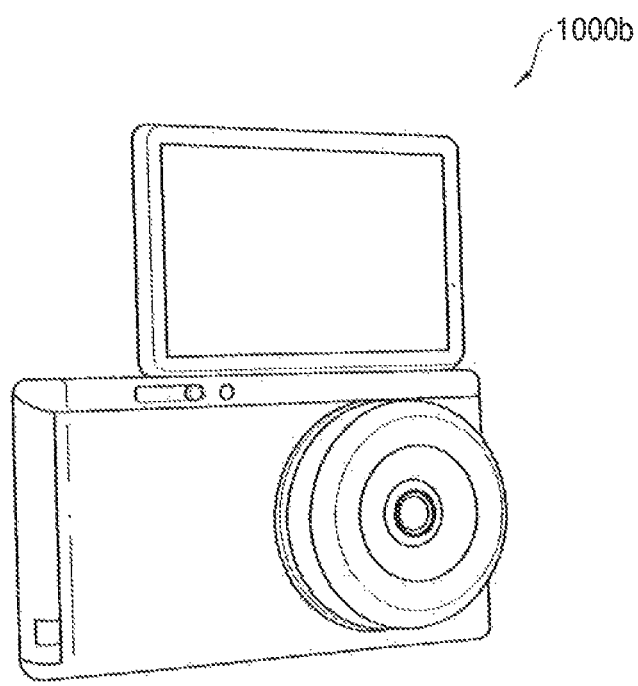
FIG. 28 is a diagram illustrating a digital camera in which the electronic device of FIG. 26 is implemented.

FIG. 26 is a block diagram illustrating an electronic device according to an exemplary embodiment of the inventive concept, FIG. 27 is a diagram illustrating a smart phone in which the electronic device of FIG. 26 is implemented, and FIG. 28 is a diagram illustrating a digital camera in which the electronic device of FIG. 26 is implemented.

Referring to FIGS. 26, 27, and 28, an electronic device 1000 may include a processor 1010, a memory device 1020, a storage device 1030, an input/output (I/O) device 1040, a power supply 1050, and an image sensor 1060. In some embodiments, the electronic device 1000 may further include a plurality of ports for communicating with a video card, a sound card, a memory card, a universal serial bus (USB) device, other electronic devices, etc. In some embodiments, as illustrated in FIG. 27, the electronic device 1000 may be a smart phone 1000a. In some embodiments, as illustrated in FIG. 28, the electronic device 1000 may be a digital camera 1000b.

As described with reference to FIGS. 1 through 24, the image sensor 1060 may include a pixel array having a shared structure in which a plurality of pixels are connected to a single floating diffusion node. The image sensor 1060 may boost the voltage of the floating diffusion node and then sequentially read the image signals of the pixels commonly connected to the floating diffusion node. The blooming effect on the image signal of short exposure pixels caused by the saturated photocharges of long exposure pixels may be reduced by boosting the voltage of the floating diffusion node before reading the image signals.

The processor 1010 may perform various computing functions. The processor 1010 may be, for example, a micro-processor, a central processing unit (CPU), an application processor (AP), etc. The processor 1010 may be coupled to the memory device 1020, the storage device 1030, and the I/O device 1040 via an address bus, a control bus, a data bus, etc. In some embodiments, the processor 1010 may be coupled to an extended bus such as a peripheral component interconnection (PCI) bus. The memory device 1020 may store data for operations of the electronic device 1000. For example, the memory device 1020 may include a volatile semiconductor memory device such as a dynamic random access memory (DRAM) device, a static random access memory (SRAM) device, a mobile DRAM, etc., and a non-volatile semiconductor memory device such as, for example, an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. The storage device 1030 may include a solid state drive (SSD) device, a hard disk drive (HDD) device, a CD-ROM device, etc.

The I/O device 1040 may include an input device such as, for example, a keyboard, a keypad, a touchpad, a touchscreen, a mouse device, etc., and/or an output device such as a display device, a printer, a speaker, etc. The power supply 1050 may supply power to the electronic device 1000. The image sensor 1060 may be coupled to other components via the buses or other communication links.

In some embodiments, the image sensor 1060 may be implemented by various packages such as, for example, Package on Package (PoP), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat-Pack (TQFP), Small Outline Integrated Circuit (SOIC), Shrink Small Outline Package (SSOP), Thin Small Outline Package (TSOP), Thin Quad Flat-Pack (TQFP), System In Package (SIP), Multi Chip Package (MCP), Wafer-Level Fabricated Package (WFP), Wafer-Level Processed Stack Package (WSP), etc.

As described above, the electronic device 1000 including the image sensor 1060 may reduce shutter noise. In some embodiments, the image sensor 1060 and the processor 1010 may be integrated in one chip. In some embodiments, the image sensor 1060 and the processor 1010 may be integrated in different chips. Although it is illustrated in FIGS. 27 and 28 that the electronic device 1000 is the smart phone 1000a or the digital camera 1000b (e.g., a mirror-less digital camera, etc.), the electronic device 1000 is not limited thereto. That is, it should be understood that the electronic device 1000 can be any electronic device including (or using) the image sensor 1060. For example, the electronic device 1000 may be implemented as a cellular phone, a smart pad, a personal digital assistant (PDA), a portable multimedia player (PMP), etc.

FIG. 29 is a block diagram illustrating an example of an interface that is used in the electronic device of FIG. 26.

Referring to FIG. 29, the electronic device 1000 may be implemented by a data processing device that uses or supports a mobile industry processor interface (MIPI) interface (e.g., a mobile phone, a personal digital assistant (PDA), a portable multimedia player (PMP), a smart phone, etc.). The electronic device 1000 may include an application processor 1110, an image sensor 1140, a display device 1150, and other various input/output devices discussed in detail below. A CSI host 1112 of the application processor 1110 may perform a serial communication with a CSI device 1141 of the image sensor 1140 using a camera serial interface (CSI).

As described with reference to FIGS. 1 through 24, the image sensor 1140 may include a pixel array having a shared structure in which a plurality of pixels are connected to a single floating diffusion node. The image sensor 1140 may boost the voltage of the floating diffusion node and then sequentially read the image signals of the pixels commonly connected to the floating diffusion node. The blooming effect on the image signal of short exposure pixels caused by the saturated photocharges of long exposure pixels may be reduced by boosting the voltage of the floating diffusion node before reading the image signals.

In exemplary embodiments, the CSI host 1112 may include a light deserializer (DES), and the CSI device 1141 may include a light serializer (SER). A DSI host 1111 of the application processor 1110 may perform serial communications with a DSI device 1151 of the display device 1150 using a display serial interface (DSI). In exemplary embodiments, the DSI host 1111 may include a light serializer (SER), and the DSI device 1151 may include a light deserializer (DES). The electronic device 1000 may further include a radio frequency (RF) chip 1160. The RF chip 1160 may perform communications with the application processor 1110. A physical layer (PHY) 1113 of the portable electronic device 1000 and a physical layer (PHY) 1161 of the RF chip 1160 may perform data communications based on a MIPI DigRF. The application processor 1110 may further include a DigRF MASTER 1114 that controls the data communications of the PHY 1161. The electronic device 1000 may include a global positioning system (GPS) 1120, a storage 1170, a MIC 1180, a DRAM device 1185, and/or a speaker 1190. The portable electronic device 1000 may perform communications using an ultra wideband (UWB) 1210, a wireless local area network (WLAN) 1220, a worldwide interoperability for microwave access (WI-MAX) 1130, etc. However, a structure and an interface of the electronic device 1000 are not limited thereto.

Exemplary embodiments can be applied to various image sensor and various imaging systems. For instance, exemplary embodiments can be applied to a mobile phone, a smart phone, a personal digital assistant (PDA), a portable multimedia player (PMP), a digital camera, a personal computer, a server computer, a workstation, a notebook, a digital television, a set-top box, a music player, a portable game console, a navigation system, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present disclosure. Accordingly, all such modifications, as well as other exemplary embodiments, are intended to be included within the scope of the present disclosure as defined in the appended claims.

What is claimed is:

1. A method of operating an image sensor comprising:
    connecting a first pixel and a second pixel commonly to a floating diffusion node;
    boosting a voltage of the floating diffusion node;
    reading a first image signal of the first pixel through the floating diffusion node after the voltage of the floating diffusion node is boosted; and
    reading a second image signal of the second pixel through the floating diffusion node after the first image signal is read,
    wherein boosting the voltage of the floating diffusion node includes:
    turning on a reset transistor to apply a first voltage, corresponding to a reset level, to the floating diffusion node;
    turning off the reset transistor to float the floating diffusion node that has the first voltage;
    applying a first voltage pulse to a first neighboring wire adjacent to a read wire, which is connected to the floating diffusion node, while the floating diffusion node is floated; and
    applying a second voltage pulse to a second neighboring wire adjacent to the read wire while the floating diffusion node is floated.

2. The method of claim 1, wherein boosting the voltage of the floating diffusion node includes:
    increasing the voltage of the floating diffusion node from the first voltage corresponding to the reset level to a second voltage that is higher than the first voltage; and
    restoring the voltage of the floating diffusion node from the second voltage to the first voltage.

3. The method of claim 1, wherein the first image signal corresponds to photocharges integrated in the first pixel during a first integration time and the second image signal corresponds to photocharges integrated in the second pixel during a second integration time, which is longer than the first integration time.

4. The method of claim 1, wherein the voltage of the floating diffusion node is boosted during an integration time of the first pixel and the second pixel.

5. The method of claim 1, wherein the voltage of the floating diffusion node is boosted to a second voltage that is higher than the first voltage by capacitive coupling between the read wire and the first neighboring wire during the first voltage pulse.

6. The method of claim 1, wherein at least a portion of a pulse duration of the first voltage pulse overlaps with at least a portion of a pulse duration of the second voltage pulse.

7. The method of claim 6, wherein the voltage of the floating diffusion node is boosted to a second voltage, which is higher than the first voltage, by capacitive coupling between the read wire and the first neighboring wire and capacitive coupling between the read wire and the second neighboring wire while the pulse duration of the first voltage pulse overlaps with the pulse duration of the second voltage pulse.

8. The method of claim 1, wherein boosting the voltage of the floating diffusion node includes:
    changing a reset voltage from the first voltage corresponding to the reset level to a second voltage that is higher than the first voltage while the reset transistor for applying the reset voltage to the floating diffusion node is turned on; and
    restoring the voltage of the floating diffusion node from the second voltage to the first voltage while the reset transistor is turned on.

9. The method of claim 1, further comprising:
    connecting a third pixel and a fourth pixel commonly to the floating diffusion node;
    reading a third image signal of the third pixel through the floating diffusion node after the second image signal is read; and
    reading a fourth image signal of the fourth pixel through the floating diffusion node after the third image signal is read.

10. The method of claim 1, wherein connecting the first pixel and the second pixel commonly to the floating diffusion node includes:
    forming the floating diffusion node in a semiconductor substrate;
    forming a first photodiode of the first pixel in the semiconductor substrate;
    forming a second photodiode of the second pixel in the semiconductor substrate;
    forming a first transfer gate of the first pixel on the semiconductor substrate between the first photodiode and the floating diffusion node; and
    forming a second transfer gate of the second pixel on the semiconductor substrate between the second photodiode and the floating diffusion node.

11. A method of operating an image sensor comprising:
    connecting a plurality of pixels commonly to a floating diffusion node;
    boosting a voltage of the floating diffusion node; and
    sequentially reading image signals integrated in the plurality of pixels through the floating diffusion node after the voltage of the floating diffusion node is boosted,
    wherein boosting the voltage of the floating diffusion node includes:
    turning on a reset transistor to apply first voltage corresponding to a reset level, to the floating diffusion node;
    turning off the reset transistor to float the floating diffusion node that has the first voltage;

applying a first voltage pulse to a first neighboring wire adjacent to a read wire, which is connected to the floating diffusion node, while the floating diffusion node is floated; and applying a second voltage pulse to a second neighboring wire adjacent to the read wire while the floating diffusion node is floated.

12. An image sensor comprising:

a controller; and a pixel array including a plurality of pixels that are arranged in a plurality of pixel groups, each pixel group including a first pixel and a second pixel that are commonly connected to a floating diffusion node, wherein the controller boosts a voltage of the floating diffusion node before reading image signals of the first pixel and the second pixel, and exposure time of the first pixel is shorter than exposure time of the second pixel, and the pixel group further includes:

a read circuit including a reset transistor having a first terminal configured to receive a reset voltage, a second terminal connected to the floating diffusion node, and a control terminal configured to receive a reset signal, and a driving transistor having a first terminal configured to receive a first voltage, a second terminal configured to output the first voltage, and a control terminal connected to the floating diffusion node, wherein the reset voltage is changed from the first voltage corresponding to a reset level to a second voltage that is higher than the first voltage while the reset transistor for applying the reset voltage to the floating diffusion node is turned on and the voltage of the floating diffusion node is restored from the second voltage to the first voltage while the reset transistor is turned on.

13. The image sensor of claim 12, wherein the pixel group further includes:

a voltage selector connected to the read circuit, wherein the voltage selector selects and outputs the first voltage or the second voltage as the reset voltage based on a control signal and the voltage of the floating diffusion node is boosted based on the reset voltage.

14. The image sensor of claim 12, wherein the plurality of pixels is arranged in a matrix form with a plurality of rows and a plurality of columns, the plurality of pixels is comprised of either short exposure pixels or long exposure pixels, and the short exposure pixels and the long exposure pixels are alternatively arranged in a row direction or a column direction.

15. The image sensor of claim 12, wherein the plurality of pixels is arranged in a matrix form with a plurality of rows and a plurality of columns, the plurality of pixels is comprised of either short exposure pixels or long exposure pixels, and the short exposure pixels and the long exposure pixels are alternatively arranged in a diagonal direction.

* * * * *